US011265179B2

(12) United States Patent
Zhuang et al.

(10) Patent No.: US 11,265,179 B2
(45) Date of Patent: Mar. 1, 2022

(54) POWER SUPPLY MANAGEMENT METHOD, DEVICE, AND SYSTEM

(71) Applicant: Huawei Technologies Co., Ltd., Shenzhen (CN)

(72) Inventors: Yan Zhuang, Nanjing (CN); Shiyong Fu, Nanjing (CN); Jincan Cao, Nanjing (CN); Fuguang Huang, Nanjing (CN); Xueqi Chen, Nanjing (CN); Rui Hua, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 16/694,184

(22) Filed: Nov. 25, 2019

(65) Prior Publication Data
US 2020/0092118 A1 Mar. 19, 2020

Related U.S. Application Data

(63) Continuation of application No. PCT/CN2018/074468, filed on Jan. 29, 2018.

(30) Foreign Application Priority Data

May 26, 2017 (CN) .......................... 201710386895.0

(51) Int. Cl.
*G06F 1/32* (2019.01)
*H04L 12/10* (2006.01)
(Continued)

(52) U.S. Cl.
CPC ............ *H04L 12/10* (2013.01); *G06F 1/3203* (2013.01); *H04W 84/12* (2013.01)

(58) Field of Classification Search
CPC .............................. H04L 12/10; G06F 1/3203
(Continued)

(56) References Cited

U.S. PATENT DOCUMENTS

2009/0031152 A1* 1/2009 Bolderl-Ermel ............................
H04L 12/40045
713/300
2010/0049998 A1* 2/2010 Karam .................... H04L 12/10
713/300
(Continued)

FOREIGN PATENT DOCUMENTS

CN 1595899 A 3/2005
CN 101707380 A 5/2010
(Continued)

OTHER PUBLICATIONS

Machine Translation and Abstract of Chinese Publication No. CN1595899, Mar. 16, 2005, 10 pages.
(Continued)

*Primary Examiner* — Robert A Cassity
(74) *Attorney, Agent, or Firm* — Conley Rose, P.C.

(57) ABSTRACT

A power supply management method performed by power sourcing equipment, includes receiving a power-on request from a level-1 powered device, where the power-on request includes a port identifier of a level-2 power supply port that is detected to be valid in the level-1 powered device, determining, based on the power-on request and an output-table power of the power sourcing equipment, a level-2 power supply port that is allowed to be powered on in the level-1 powered device, and sending a power-on instruction to the level-1 powered device, where the power-on instruction includes a port identifier of the level-2 power supply port that is allowed to be powered on in the level-1 powered device. The power sourcing equipment uses the level-1 powered device and a level-2 powered device connected to the level-1 powered device as a whole, and centrally performs power supply control and power management.

21 Claims, 6 Drawing Sheets

(51) Int. Cl.
*G06F 1/3203* (2019.01)
*H04W 84/12* (2009.01)

(58) Field of Classification Search
USPC .......................................................... 713/310
See application file for complete search history.

(56) References Cited

U.S. PATENT DOCUMENTS

| | | | | |
|---|---|---|---|---|
| 2011/0126035 | A1* | 5/2011 | Kaneko | H04L 41/0833 |
| | | | | 713/320 |
| 2011/0241425 | A1 | 10/2011 | Hunter, Jr. et al. | |
| 2012/0173900 | A1 | 7/2012 | Diab et al. | |
| 2014/0359320 | A1* | 12/2014 | Hua | G06F 1/26 |
| | | | | 713/300 |
| 2015/0127957 | A1* | 5/2015 | Sethi | G06F 1/26 |
| | | | | 713/300 |
| 2016/0191256 | A1* | 6/2016 | Wendt | G06F 1/266 |
| | | | | 713/300 |
| 2016/0227630 | A1 | 8/2016 | Wendt et al. | |
| 2017/0237580 | A1* | 8/2017 | Radermacher | H05B 47/185 |
| | | | | 307/38 |
| 2018/0278428 | A1* | 9/2018 | Yseboodt | G06F 1/266 |
| 2018/0375673 | A1* | 12/2018 | Wendt | G06F 1/26 |
| 2019/0124262 | A1* | 4/2019 | El Kolli | H04N 5/23241 |
| 2020/0275025 | A1* | 8/2020 | El Kolli | H04N 5/23241 |

FOREIGN PATENT DOCUMENTS

| | | |
|---|---|---|
| CN | 102761422 A | 10/2012 |
| CN | 105049216 A | 11/2015 |
| CN | 205265731 U | 5/2016 |
| CN | 106026031 A | 10/2016 |
| CN | 205921705 U | 2/2017 |
| CN | 106656019 A | 5/2017 |

OTHER PUBLICATIONS

Machine Translation and Abstract of Chinese Publication No. CN205921705, Feb. 1, 2017, 15 pages.
Foreign Communication From A Counterpart Application, PCT Application No. PCT/CN2018/074468, English Translation of International Search Report dated Mar. 28, 2018, 2 pages.
Foreign Communication From A Counterpart Application, PCT Application No. PCT/CN2018/074468, English Translation of Written Opinion dated Mar. 28, 2018, 4 pages.

\* cited by examiner

POWER SUPPLY MANAGEMENT METHOD, DEVICE, AND SYSTEM

CROSS-REFERENCE TO RELATED APPLICATIONS

This application is a continuation of International Patent Application No. PCT/CN2018/074468 filed on Jan. 29, 2018, which claims priority to Chinese Patent Application No. 201710386895.0 filed on May 26, 2017. The disclosures of the aforementioned applications are hereby incorporated by reference in their entireties.

TECHNICAL FIELD

The present disclosure relates to the communications field, and in particular, to a power supply management method, a device, and a system.

BACKGROUND

A mobile terminal such as a smartphone or a laptop can access the Internet using a wireless local area network (WLAN). In some scenarios (for example, in a students' dormitory, a hospital ward, and a hotel), if an access point (AP) is deployed only in a public area, indoor signal quality is poor. However, if a quantity of deployed APs is increased, device management complexity increases.

A distributed WLAN includes a central AP and a distributed AP. One central AP is connected to a plurality of distributed APs. The distributed WLAN can provide wider network coverage and simplify device management and configuration.

FIG. 1 is a conventional architecture for supplying electricity to an AP using a Power over Ethernet (PoE) technology in the distributed WLAN. An Ethernet switch serves as power sourcing equipment (also referred to as PSE) to supply electricity to a central AP. The central AP is a powered device (also referred to as PD) of the Ethernet switch and obtains electricity from the Ethernet switch. In addition, the central AP serves as PSE to supply electricity to each distributed AP connected to the central AP. Each distributed AP serves as a PD of the central AP, and each obtains electricity from the central AP. In this case, not only the Ethernet switch needs to perform power management and allocation, but also the central AP needs to perform power allocation and management on each distributed AP. This is unfavorable to power allocation and management in the entire distributed WLAN, and also increases overheads of the central AP.

SUMMARY

This application provides a power supply management method, a device, and a system. Power sourcing equipment centrally performs power supply control and power management on a level-1 powered device and a level-2 powered device. This can improve power supply management efficiency and power management efficiency of an entire system, and reduce overheads of the level-1 powered device.

According to a first aspect, a power supply management method is provided, including receiving, by power sourcing equipment, a power-on request from a level-1 powered device, where the power-on request includes a port identifier of a level-2 power supply port that is detected to be valid in the level-1 powered device, and the level-1 powered device is connected to a level-1 power supply port of the power sourcing equipment, and extracts electricity from the level-1 power supply port, determining, by the power sourcing equipment based on the power-on request and an outputtable power of the power sourcing equipment, a level-2 power supply port that is allowed to be powered on in the level-1 powered device, and sending, by the power sourcing equipment, a power-on instruction to the level-1 powered device, where the power-on instruction includes a port identifier of the level-2 power supply port that is allowed to be powered on in the level-1 powered device, and the power-on instruction is used to instruct the level-1 powered device to power on the level-2 power supply port that is allowed to be powered on.

According to the power supply management method provided in this application, the power sourcing equipment determines, based on the outputtable power of the power sourcing equipment and a detection result of a level-2 power supply port in the level-1 powered device, the level-2 power supply port that is allowed to be powered on in the level-1 powered device such that the level-1 powered device does not need to deploy power supply control or manage a power. In addition, the power sourcing equipment directly determines, based on the outputtable power of the power sourcing equipment, the level-2 power supply port that is allowed to be powered on, and therefore determines a level-2 powered device that is allowed to be powered on. This improves power supply management efficiency of an entire system.

With reference to the first aspect, in a first possible implementation of the first aspect, the determining, by the power sourcing equipment based on the power-on request and an outputtable power of the power sourcing equipment, a level-2 power supply port that is allowed to be powered on in the level-1 powered device includes obtaining, by the power sourcing equipment based on the power-on request, the level-2 power supply port that is detected to be valid, and when the outputtable power of the power sourcing equipment meets a sum of power-on powers required by all level-2 power supply ports that are detected to be valid in the level-1 powered device, determining all the level-2 power supply ports that are detected to be valid, as level-2 power supply ports that are allowed to be powered on, or when the outputtable power of the power sourcing equipment does not meet a sum of power-on powers required by all level-2 power supply ports that are detected to be valid in the level-1 powered device, determining, based on a power supply policy from all the level-2 power supply ports that are detected to be valid, the power supply port that is allowed to be powered on.

With reference to the first possible implementation of the first aspect, in a second possible implementation of the first aspect, after sending, by the power sourcing equipment, a power-on instruction to the level-1 powered device, the method further includes receiving, by the power sourcing equipment, a power negotiation request sent by the level-1 powered device, where the power negotiation request includes the port identifier and a required power of the level-2 power supply port that is allowed to be powered on in the level-1 powered device, allocating, by the power sourcing equipment based on the outputtable power of the power sourcing equipment and the power negotiation request, a supply power to the level-2 power supply port that is allowed to be powered on in the level-1 powered device, and returning, by the power sourcing equipment, a power negotiation response to the level-1 powered device, where the power negotiation response includes the port identifier and the supply power of the level-2 power supply port that is allowed to be powered on in the level-1 powered device such that the level-1 powered device supplies electricity based on the supply power.

With reference to the second possible implementation of the first aspect, in a third possible implementation of the first aspect, allocating, by the power sourcing equipment based on the outputtable power of the power sourcing equipment and the power negotiation request, a supply power to the level-2 power supply port that is allowed to be powered on in the level-1 powered device includes obtaining, by the power sourcing equipment from the power negotiation request, the required power of the level-2 power supply port that is allowed to be powered on in the level-1 powered device, and when the outputtable power of the power sourcing equipment meets a sum of required powers of all level-2 power supply ports that are allowed to be powered on, allocating, based on the required powers, supply powers to all the level-2 power supply ports that are allowed to be powered on in the level-1 powered device, or when the outputtable power of the power sourcing equipment does not meet a sum of required powers of all level-2 power supply ports that are allowed to be powered on, allocating, based on a power allocation policy, the supply power to the power supply port that is allowed to be powered on in the level-1 powered device.

The power allocation policy includes any one or more of the following:
  In ascending order of required power;
  In descending order of required power;
  In descending order of port priority;
  In ascending order of port number; and
  In descending order of port number.

With reference to the first aspect, in a fourth possible implementation of the first aspect, the power-on request further includes power information of the level-2 power supply port that is detected to be valid, and the power information is a power class or a required power, and the power-on instruction is further used to instruct the level-1 powered device to supply, based on a corresponding power class, electricity to the level-2 power supply port that is allowed to be powered on.

With reference to the fourth possible implementation of the first aspect, in a fifth possible implementation of the first aspect, determining, by the power sourcing equipment based on the power-on request and an outputtable power of the power sourcing equipment, a level-2 power supply port that is allowed to be powered on in the level-1 powered device includes obtaining, by the power sourcing equipment based on the power-on request, the required power of the level-2 power supply port that is detected to be valid, and when the outputtable power of the power sourcing equipment meets a sum of required powers required by all level-2 power supply ports that are detected to be valid in the level-1 powered device, determining all the level-2 power supply ports that are detected to be valid, as level-2 power supply ports that are allowed to be powered on, or when the outputtable power of the power sourcing equipment does not meet a sum of required powers required by all level-2 power supply ports that are detected to be valid in the level-1 powered device, determining, based on a power supply policy from all the level-2 power supply ports that are detected to be valid, the level-2 power supply port that is allowed to be powered on.

If the level-1 powered device obtains a power class of a level-2 power supply port through physical layer classification, the power sourcing equipment determines, directly based on power classes (the required powers) of the level-2 power supply ports instead of based on the power-on powers, whether a level-2 power supply port is allowed to be powered on. In this case, once allowed to be powered on, a level-2 power supply port can be directly supplied with electricity based on a power class of the level-2 power supply port.

With reference to any one of the first aspect or the foregoing possible implementations, in a sixth possible implementation of the first aspect, the power supply policy includes any one or more of the following:
  In ascending order of port number;
  In descending order of port number;
  In descending order of port priority; and
  Based on a power supply time segment.

If the level-2 power supply port that is allowed to be powered on is determined based on the power supply time segment, it can be ensured that a level-2 powered device that urgently needs to be supplied with electricity currently obtains required electricity preferentially, improving a power supply effect of the entire system.

With reference to any one of the first aspect or the foregoing possible implementations, in a seventh possible implementation of the first aspect, the method further includes monitoring, by the power sourcing equipment, traffic of a first level-2 powered device in real time, where the first level-2 powered device is connected to a first level-2 power supply port of the level-1 powered device and extracts electricity from the first level-2 power supply port, and the first level-2 power supply port is a level-2 power supply port that is allowed to be powered on in the level-1 powered device, and adjusting, by the power sourcing equipment, a supply power of the first level-2 power supply port based on the traffic of the first level-2 powered device.

According to the power supply management method provided in this application, the power sourcing equipment can monitor traffic of a powered-on level-2 powered device in real time, and adjust a supply power in real time based on the traffic. This can increase power source utilization of the power sourcing equipment, and improve power supply performance of the entire system.

With reference to the seventh possible implementation of the first aspect, in an eighth possible implementation of the first aspect, adjusting, by the power sourcing equipment, a supply power of the first level-2 power supply port based on the traffic of the first level-2 powered device includes, if the traffic of the first level-2 powered device is less than a preset traffic threshold within a preset monitoring time, reducing, by the power sourcing equipment, the supply power of the first level-2 power supply port, and sending a power adjustment instruction to the level-1 powered device, where the power adjustment instruction includes a port identifier of the first level-2 power supply port and an adjusted supply power, and the power adjustment instruction is used to instruct the level-1 powered device to supply electricity to the first level-2 power supply port based on the adjusted supply power.

With reference to the seventh or eighth possible implementation of the first aspect, in a ninth possible implementation of the first aspect, adjusting, by the power sourcing equipment, a supply power of the first level-2 power supply port based on the traffic of the first level-2 powered device further includes, if the first level-2 powered device has no traffic within the preset monitoring time, sending, by the power sourcing equipment, a power-off instruction to the level-1 powered device, where the power-off instruction includes the port identifier of the first level-2 power supply port, and the power-off instruction is used to instruct the level-1 powered device to power off the first level-2 power supply port.

If a level-2 powered device that has no traffic is powered off, the power source utilization of the power sourcing equipment can be further increased.

With reference to the ninth possible implementation of the first aspect, in a tenth possible implementation of the first aspect, the method further includes keeping the first level-2 power supply port powered off within preset power-off duration, and when the preset power-off duration elapses, sending, by the power sourcing equipment, a power-on instruction to the level-1 powered device, where the power-on instruction includes the port identifier of the first level-2 power supply port such that the level-1 powered device powers on the first level-2 power supply port again, and continuing, by the power sourcing equipment to monitor the traffic of the first level-2 powered device.

According to a second aspect, a power supply management method is provided, including performing, by a level-1 powered device, detection on all level-2 power supply ports of the level-1 powered device, to determine a level-2 power supply port that is detected to be valid, sending, by the level-1 powered device, a power-on request to power sourcing equipment, where the power-on request includes a port identifier of the level-2 power supply port that is detected to be valid in the level-1 powered device such that the power sourcing equipment determines, from the level-2 power supply port that is detected to be valid in the level-1 powered device, a level-2 power supply port that is allowed to be powered on, and the level-1 powered device is connected to a level-1 power supply port of the power sourcing equipment, and extracts electricity from the level-1 power supply port, receiving, by the level-1 powered device, a power-on instruction returned by the power sourcing equipment, where the power-on instruction includes a port identifier of the port allowed to be powered on, and the port allowed to be powered on is the level-2 power supply port that is detected to be valid and allowed to be powered on in the level-1 powered device, and powering on, by the level-1 powered device according to the power-on instruction, the port allowed to be powered on.

According to the power supply management method provided in this application, the level-1 powered device sends the port identifier of the level-2 power supply port that is detected to be valid in the level-1 powered device to the power sourcing equipment, and the power sourcing equipment directly determines the level-2 power supply port that is allowed to be powered on. This can avoid the following problem. After the level-1 powered device directly powers on the level-2 power supply port based on a detection result, because a power of the power sourcing equipment is insufficient (because the level-1 powered device extracts electricity from the power sourcing equipment before supplying electricity to a level-2 powered device), the level-1 powered device needs to negotiate a power with the power sourcing equipment, to re-determine a level-2 power supply port that is allowed to be powered on, resulting in complex power supply management and low efficiency. In addition, power supply management and power management functions do not need to be configured for the level-1 powered device. This can further reduce device costs and overheads.

With reference to the second aspect, in a first possible implementation of the second aspect, after powering on, by the level-1 powered device according to the power-on instruction, the port allowed to be powered on, the method further includes obtaining, by the level-1 powered device through data link layer classification, a required power of the port allowed to be powered on, sending, by the level-1 powered device, a power negotiation request to the power sourcing equipment, where the power negotiation request includes the port identifier and the required power of the port allowed to be powered on such that the power sourcing equipment allocates a supply power to the port allowed to be powered on, receiving, by the level-1 powered device, a power negotiation response returned by the power sourcing equipment, where the power negotiation response includes the port identifier and the supply power of the port allowed to be powered on, and supplying, by the level-1 powered device based on the supply power of the port allowed to be powered on in the power negotiation response, electricity to the port allowed to be powered on.

With reference to the second aspect, in a second possible implementation of the second aspect, before the sending, by the level-1 powered device, a power-on request to power sourcing equipment, the method further includes obtaining, by the level-1 powered device through physical layer classification, a power class of the level-2 power supply port that is detected to be valid.

With reference to the second possible implementation of the second aspect, in a third possible implementation of the second aspect, the power-on request further includes the power class of the level-2 power supply port that is detected to be valid in the level-1 powered device, and correspondingly, after powering on, by the level-1 powered device according to the power-on instruction, the port allowed to be powered on, the method further includes supplying, by the level-1 powered device based on the power class of the port allowed to be powered on, electricity to the port allowed to be powered on.

With reference to any one of the second aspect or the foregoing possible implementations, in a fourth possible implementation of the second aspect, after supplying electricity to the port allowed to be powered on, the method further includes receiving, by the level-1 powered device, a power adjustment instruction sent by the power sourcing equipment, where the power adjustment instruction includes the port identifier and an adjusted supply power of the port allowed to be powered on, and adjusting, by the level-1 powered device according to the adjusted supply power of the port allowed to be powered on in the power adjustment instruction, the supply power of the port allowed to be powered on.

With reference to any one of the second aspect or the foregoing possible implementations, in a fifth possible implementation of the second aspect, after supplying electricity to the port allowed to be powered on, the method further includes receiving, by the level-1 powered device, a power-off instruction sent by the power sourcing equipment, where the power-off instruction includes the port identifier of the port allowed to be powered on, and powering off, by the level-1 powered device according to the power-off instruction, the port allowed to be powered on.

According to a third aspect, power sourcing equipment is provided. The power sourcing equipment includes a processor, a PSE chip, and a level-1 power supply port, where the processor is connected to the PSE chip. The processor is connected to the level-1 power supply port, the PSE chip is connected to the level-1 power supply port, and the processor is configured to receive a power-on request from a level-1 powered device using the level-1 power supply port, where the power-on request includes a port identifier of a level-2 power supply port that is detected to be valid in the level-1 powered device, and the level-1 powered device is connected to the level-1 power supply port, and extracts electricity from the level-1 power supply port, determine, based on the power-on request and an outputtable power of the power sourcing equipment, a level-2 power supply port that is allowed to be powered on in the level-1 powered device, and send a power-on instruction to the level-1 powered device using the level-1 power supply port, where the power-on instruction includes a port identifier of the level-2 power supply port that is allowed to be powered on in the level-1 powered device, and the power-on instruction is used to instruct the level-1 powered device to power on the level-2 power supply port that is allowed to be powered on.

The power sourcing equipment provided in this application directly provides power supply control for a level-2 powered device connected to the level-1 powered device, improving power supply management efficiency and power supply performance of an entire system.

With reference to the third aspect, in a first possible implementation of the third aspect, the processor is configured to obtain, based on the power-on request, the level-2 power supply port that is detected to be valid, and when the outputtable power of the power sourcing equipment meets a sum of power-on powers required by all level-2 power supply ports that are detected to be valid in the level-1 powered device, determine all the level-2 power supply ports that are detected to be valid, as level-2 power supply ports that are allowed to be powered on, or when the outputtable power of the power sourcing equipment does not meet a sum of power-on powers required by all level-2 power supply ports that are detected to be valid in the level-1 powered device, determine, based on a power supply policy from all the level-2 power supply ports that are detected to be valid, the power supply port that is allowed to be powered on.

With reference to the first possible implementation of the third aspect, in a second possible implementation of the third aspect, the processor is further configured to receive, using the level-1 power supply port, a power negotiation request sent by the level-1 powered device, where the power negotiation request includes the port identifier and a required power of the level-2 power supply port that is allowed to be powered on in the level-1 powered device, allocate, based on the outputtable power of the power sourcing equipment and the power negotiation request, a supply power to the level-2 power supply port that is allowed to be powered on in the level-1 powered device, and return a power negotiation response to the level-1 powered device using the level-1 power supply port, where the power negotiation response includes the port identifier and the supply power of the level-2 power supply port that is allowed to be powered on in the level-1 powered device such that the level-1 powered device supplies electricity based on the supply power.

With reference to the third aspect, in a third possible implementation of the third aspect, the power-on request further includes power information of the level-2 power supply port that is detected to be valid, and the power information is a power class or a required power, and the power-on instruction is further used to instruct the level-1 powered device to supply, based on a corresponding power class, electricity to the level-2 power supply port that is allowed to be powered on, and the processor is configured to obtain, based on the power-on request, the required power of the level-2 power supply port that is detected to be valid, and when the outputtable power of the power sourcing equipment meets a sum of required powers required by all level-2 power supply ports that are detected to be valid in the level-1 powered device, determine all the level-2 power supply ports that are detected to be valid, as level-2 power supply ports that are allowed to be powered on, or when the outputtable power of the power sourcing equipment does not meet a sum of required powers required by all level-2 power supply ports that are detected to be valid in the level-1 powered device, determine, based on a power supply policy from all the level-2 power supply ports that are detected to be valid, the power supply port that is allowed to be powered on.

With reference to any one of the third aspect or the foregoing possible implementations, in a fourth possible implementation of the third aspect, the processor is further configured to monitor traffic of a first level-2 powered device in real time, where the first level-2 powered device is connected to a first level-2 power supply port of the level-1 powered device and extracts electricity from the first level-2 power supply port, and the first level-2 power supply port is a level-2 power supply port that is allowed to be powered on in the level-1 powered device, and adjust a supply power of the first level-2 power supply port based on the traffic of the first level-2 powered device.

With reference to the fourth possible implementation of the third aspect, in a fifth possible implementation of the third aspect, the processor is further configured to, if the traffic of the first level-2 powered device is less than a preset traffic threshold within a preset monitoring time, reduce the supply power of the first level-2 power supply port, and send a power adjustment instruction to the level-1 powered device, where the power adjustment instruction includes a port identifier of the first level-2 power supply port and an adjusted supply power, and the power adjustment instruction is used to instruct the level-1 powered device to supply electricity to the first level-2 power supply port based on the adjusted supply power, or if the first level-2 powered device has no traffic within the preset monitoring time, send a power-off instruction to the level-1 powered device, where the power-off instruction includes a port identifier of the first level-2 power supply port, and the power-off instruction is used to instruct the level-1 powered device to power off the first level-2 power supply port.

With reference to any one of the third aspect or the foregoing possible implementations, in a sixth possible implementation of the third aspect, the PSE chip is configured to perform detection on the level-1 power supply port, to determine that the level-1 powered device is a valid powered device, and control power supply to the level-1 power supply port. Further, before the level-1 powered device is powered on, the PSE chip performs detection on the level-1 power supply port, and if the level-1 power supply port is connected to a valid powered device (that is, the level-1 powered device is a valid powered device), connects a power source to the level-1 power supply port to supply electricity to the level-1 powered device.

According to a fourth aspect, a powered device is provided. The powered device includes a power extraction port, a PD chip, a detection control module, a power supply control module, and a plurality of level-2 power supply ports, where the detection control module is connected to the plurality of power supply ports, the power supply control module is connected to the plurality of power supply ports, the PD chip is connected to the power extraction port, and the power extraction port is connected to power sourcing equipment, the PD chip is configured to extract electricity from the power sourcing equipment to supply electricity to the detection control module and the power supply control module, the detection control module is configured to perform detection on the plurality of level-2 power supply ports, and send a power-on request to the power sourcing equipment using the power extraction port, where the power-on request includes a port identifier of a level-2 power supply port that is detected to be valid in the plurality of level-2 power supply ports, and the power supply control module is configured to receive a power-on instruction from the power sourcing equipment using the power extraction port, where the power-on instruction includes a port identifier of a port allowed to be powered on, and the port allowed to be powered on is a level-2 power supply port in the plurality of level-2 power supply ports that is detected to be valid and allowed to be powered on, and power on, according to the power-on instruction, the port allowed to be powered on.

The powered device provided in this application cooperates with the power sourcing equipment using the detection control module and the power supply control module to control power supply to the level-2 power supply ports, reducing overheads and implementation costs of the powered device.

With reference to the fourth aspect, in a first possible implementation of the fourth aspect, the power supply control module is further configured to obtain, through data link layer classification, a required power of the port allowed to be powered on, send a power negotiation request to the power sourcing equipment using the power extraction port, where the power negotiation request includes the port identifier and the required power of the port allowed to be powered on such that the power sourcing equipment allocates a supply power to the port allowed to be powered on, receive, using the power extraction port, a power negotiation response returned by the power sourcing equipment, where the power negotiation response includes the port identifier and the supply power of the port allowed to be powered on, and supply, based on the supply power of the port allowed to be powered on in the power negotiation response, electricity to the port allowed to be powered on.

With reference to the fourth aspect, in a second possible implementation of the fourth aspect, before sending the power-on request, the detection control module is further configured to obtain, through physical layer classification, a power class of the level-2 power supply port that is detected to be valid, the power-on request further includes the power class of the level-2 power supply port that is detected to be valid, and correspondingly, the power supply control module is further configured to supply, based on a power class of the port allowed to be powered on, electricity to the port allowed to be powered on after powering on the port allowed to be powered on.

With reference to any one of the fourth aspect or the foregoing possible implementations, in a third possible implementation of the fourth aspect, the power supply control module is further configured to receive a power adjustment instruction from the power sourcing equipment using the power extraction port, where the power adjustment instruction includes the port identifier and an adjusted supply power of the port allowed to be powered on, and supply, based on the adjusted supply power of the port allowed to be powered on, electricity to the port allowed to be powered on.

With reference to any one of the fourth aspect or the foregoing possible implementations, in a fourth possible implementation of the fourth aspect, the power supply control module is further configured to receive a power-off instruction from the power sourcing equipment using the power extraction port, where the power-off instruction includes the port identifier of the port allowed to be powered on, and power off, according to the power-off instruction, the port allowed to be powered on.

According to a fifth aspect, power sourcing equipment is provided, including a function module for implementing the power supply management method in the first aspect.

According to a sixth aspect, a level-1 powered device is provided, including a function module for implementing the power supply management method in the second aspect.

According to a seventh aspect, a computer storage medium is provided, and is configured to store a computer program. The computer program includes an instruction for executing the power supply management method in the first aspect.

According to an eighth aspect, a computer storage medium is provided, and is configured to store a computer program. The computer program includes an instruction for executing the power supply management method in the second aspect.

According to a ninth aspect, a power supply management system is provided, including the power sourcing equipment in the third aspect or the fifth aspect, the level-1 powered device in the fourth aspect or the sixth aspect, and a plurality of level-2 powered devices, where the plurality of level-2 powered devices are connected to a plurality of level-2 power supply ports of the level-1 powered device, respectively.

DESCRIPTION OF EMBODIMENTS

With reference to the accompanying drawings, the following describes in detail a power supply management method, a device, and a system that are provided in the embodiments of the present disclosure.

Figure 1:
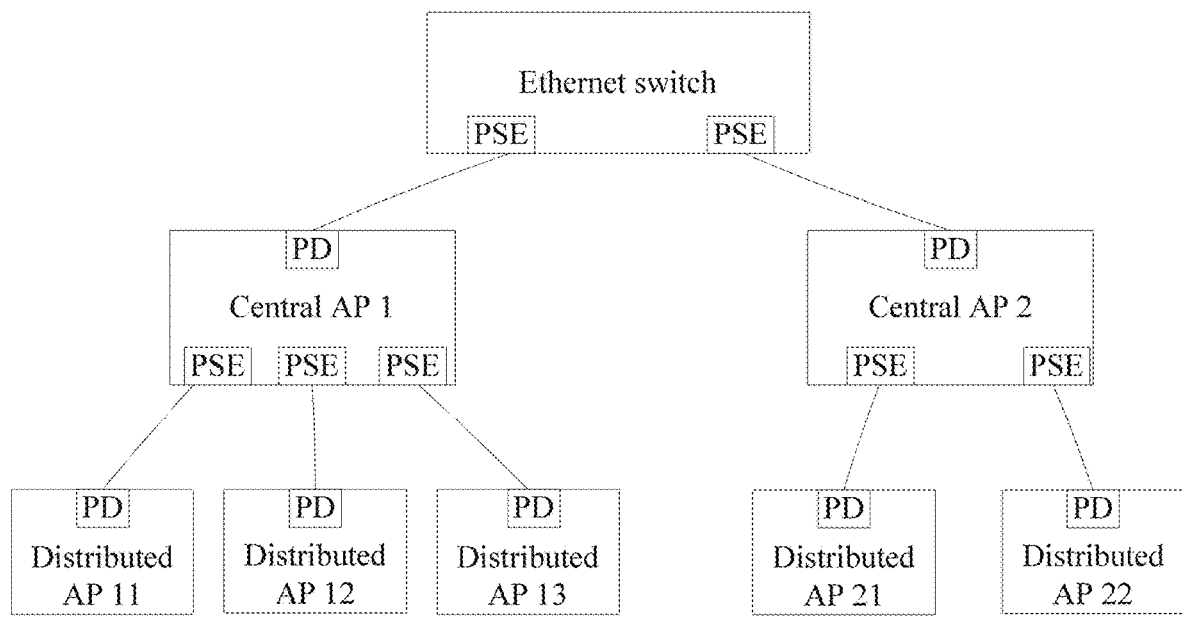
FIG. 1 is a schematic diagram of PoE in a distributed WLAN.
Figure 2:
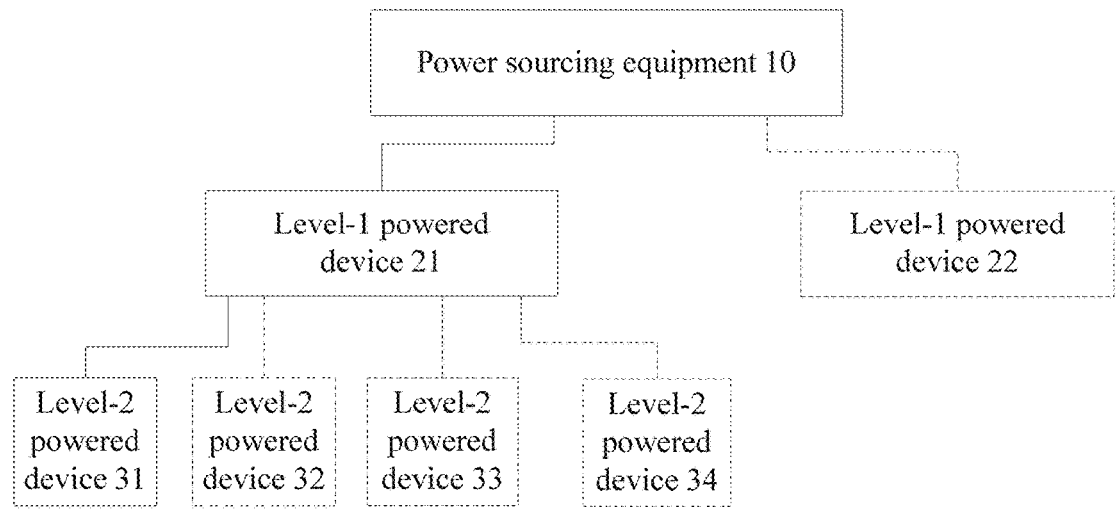
FIG. 2 is a schematic structural diagram of a power supply management system according to an embodiment of the present disclosure.

FIG. 2 is a schematic structural diagram of a power supply management system according to an embodiment of the present disclosure. The system includes power sourcing equipment 10, a level-1 powered device 21, and a level-2 powered device 31. The level-2 powered device 31 is connected to the level-1 powered device 21, and the level-1 powered device 21 is connected to the power sourcing equipment 10.

Optionally, a plurality of level-2 powered devices is connected to the level-1 powered device 21. For example, as shown in FIG. 2, four level-2 powered devices (level-2 powered devices 31 to 34) are connected to the level-1 powered device 21.

The power sourcing equipment in this embodiment of the present disclosure may be an Ethernet device that supports PoE, such as a switch or a router. The power sourcing equipment usually includes a PSE chip. The PSE chip is a chip designed to provide a PoE protocol-compliant PSE function, and can usually provide detection and classification functions.

Figure 3:
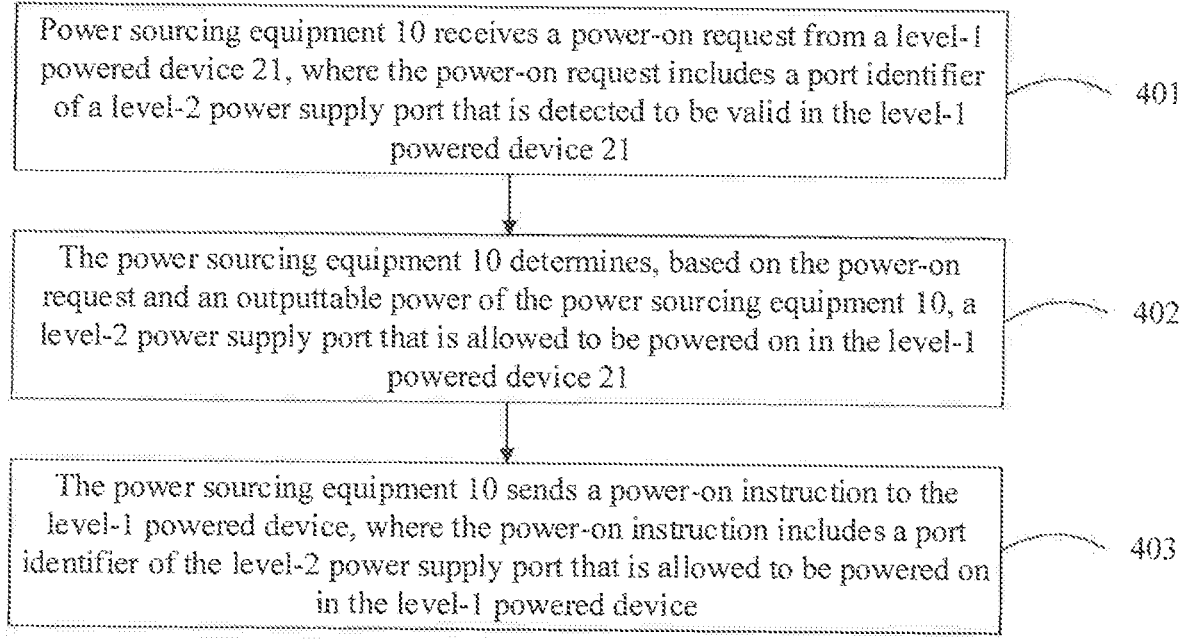
FIG. 3 is a schematic flowchart of a power supply management method according to an embodiment of the present disclosure.

The power sourcing equipment 10 supplies electricity to the level-1 powered device 21, and controls power supply to the level-2 powered devices (for example, the level-2 powered devices 31 to 34 in FIG. 2) connected to the level-1 powered device 21. FIG. 3 is a schematic flowchart of a power supply management method according to an embodiment of the present disclosure. The method includes the following steps 401 to 403.

Step 401. The power sourcing equipment 10 receives a power-on request from the level-1 powered device 21, where the power-on request includes a port identifier of a level-2 power supply port that is detected to be valid in the level-1 powered device 21, and the level-1 powered device 21 is connected to a level-1 power supply port of the power sourcing equipment 10, and extracts electricity from the level-1 power supply port.

Step 402. The power sourcing equipment 10 determines, based on the power-on request and an outputtable power of the power sourcing equipment 10, a level-2 power supply port that is allowed to be powered on in the level-1 powered device 21.

Step 403. The power sourcing equipment 10 sends a power-on instruction to the level-1 powered device, where the power-on instruction includes a port identifier of the level-2 power supply port that is allowed to be powered on in the level-1 powered device, and the power-on instruction is used to instruct the level-1 powered device to power on the level-2 power supply port that is allowed to be powered on.

Further, the level-1 powered device 21 may report, to the power sourcing equipment 10, a power class of a level-2 powered device connected to the level-1 powered device 21, and the power sourcing equipment 10 performs power allocation and management on the level-2 powered device connected to the level-1 powered device 21.

Optionally, a plurality of level-1 powered devices is connected to the power sourcing equipment 10. For example, as shown in FIG. 2, the system may further include a level-1 powered device 22, and the level-1 powered device 22 is connected to the power sourcing equipment 10. The power sourcing equipment 10 may also perform power supply control and power management on one or more level-2 powered devices (not shown in FIG. 2) connected to the level-1 powered device 22.

In a specific implementation, a level-1 powered device may be a central AP in a distributed WLAN, and a level-2 powered device may be a distributed AP in the distributed WLAN.

It can be understood that the level-2 powered device extracts electricity from the level-1 powered device, and the level-1 powered device extracts electricity from the power sourcing equipment and then supplies electricity to the level-2 powered device, and therefore more electricity consumed by the level-2 powered device indicates more electricity needed to be extracted by the level-1 powered device from the power sourcing equipment, and a greater total power output by the power sourcing equipment. In view of this, in this embodiment of the present disclosure, the power sourcing equipment uses the level-1 powered device and the level-2 powered device as a whole, and centrally performs power supply control (power-on/power-off) and supply power allocation and management.

In the power supply management system provided in this embodiment of the present disclosure, the power sourcing equipment uses the level-1 powered device and the level-2 powered device connected to the level-1 powered device as a whole, and centrally performs power supply control and power management. In this way, power supply management efficiency can be improved, and the level-1 powered device does not need to perform power allocation and management, thereby reducing overheads of the level-1 powered device.

Figure 4:
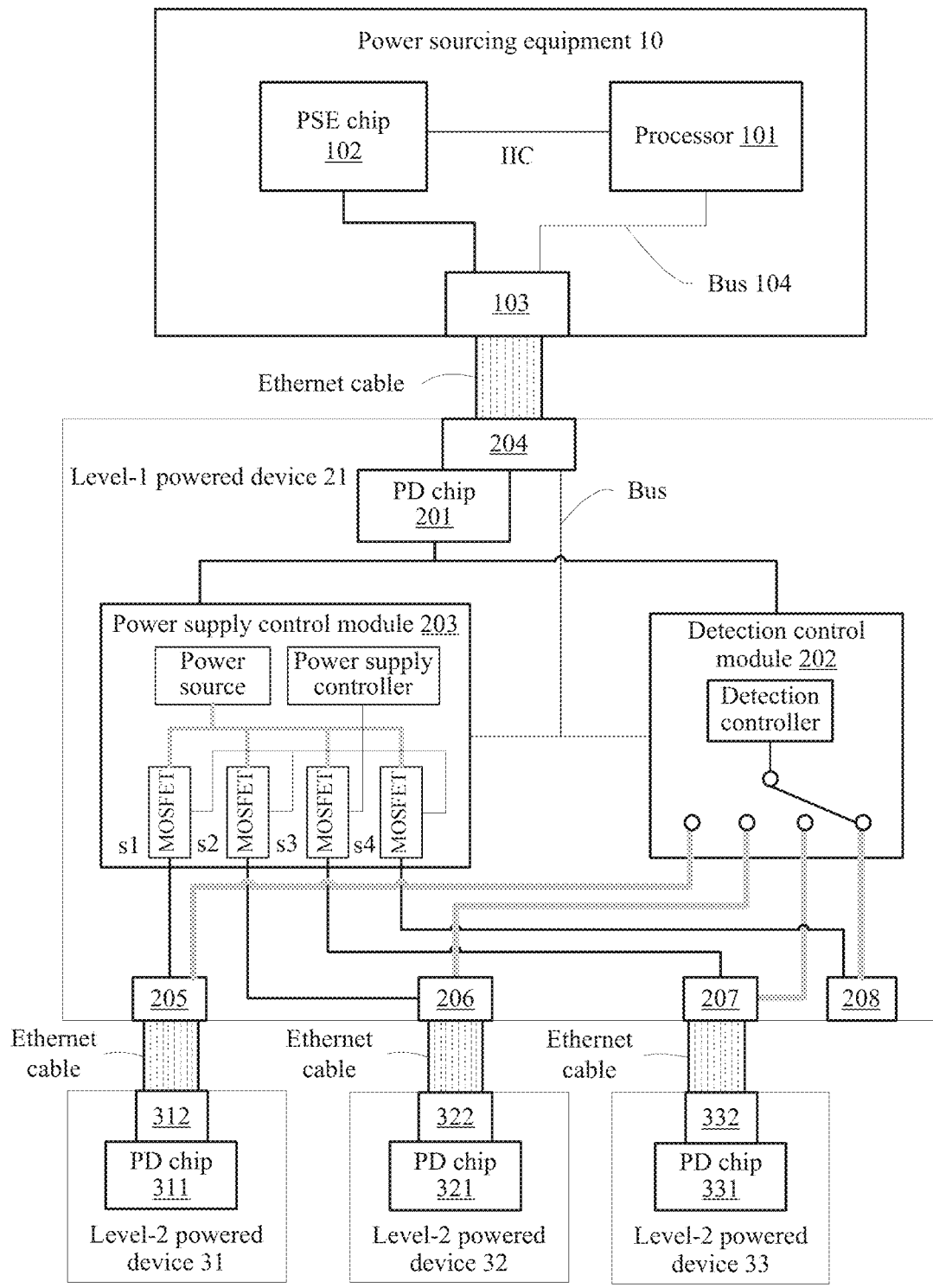
FIG. 4 is a schematic diagram of a device structure and a connection relationship in a power supply management system according to an embodiment of the present disclosure.

Based on the power supply management system shown in FIG. 2, FIG. 4 is a schematic diagram of a device structure and a connection relationship in a power supply management system according to an embodiment of the present disclosure. As shown in FIG. 4, the power sourcing equipment 10 includes a processor 101, a PSE chip 102, and a level-1 power supply port 103.

The level-1 powered device 21 includes a PD chip 201, a detection control module 202, a power supply control module 203, a power extraction port 204, and level-2 power supply ports 205 to 208. The power extraction port 204 and the level-2 power supply ports 205 to 208 are all Ethernet ports. The power extraction port 204 of the level-1 powered device 21 is connected to the level-1 power supply port 103 of the power sourcing equipment 10 using an Ethernet cable. The PD chip 201 is connected to the power extraction port 204 using a rectifier bridge (not shown in the figure). After the PD chip 201 extracts electricity from the power sourcing equipment 10, a power system (not shown) of the level-1 powered device 21 converts the electricity to a voltage required by the level-1 powered device 21, to supply electricity to components of the level-1 powered device 21.

The power sourcing equipment 10 may further include another one or more level-1 power supply ports.

The level-2 powered device 31 includes a PD chip 311 and a power extraction port 312, and the PD chip 311 is connected to the power extraction port 312 using a rectifier bridge (not shown). The power extraction port 312 of the level-2 powered device 31 is connected to a level-2 power supply port 205 of the level-1 powered device 21 using an Ethernet cable.

A level-2 powered device 32 includes a PD chip 321 and a power extraction port 322, and the PD chip 321 is connected to the power extraction port 322 using a rectifier bridge (not shown). The power extraction port 322 of the level-2 powered device 32 is connected to a level-2 power supply port 206 of the level-1 powered device 21 using an Ethernet cable.

A level-2 powered device 33 includes a PD chip 331 and a power extraction port 332, and the PD chip 331 is connected to the power extraction port 332 using a rectifier bridge (not shown). The power extraction port 332 of the level-2 powered device 33 is connected to a level-2 power supply port 207 of the level-1 powered device 21 using an Ethernet cable.

In this embodiment of the present disclosure, the processor 101 may be a central processing unit (CPU), a network processor (NP), or a combination of the CPU and the NP.

The processor 101 and the PSE chip 102 may be connected to each other using an inter-integrated circuit (IIC) bus.

The processor 101 is connected to the level-1 power supply port 103 using a bus 104. The bus 104 may include an address bus, a data bus, a control bus, and the like. For ease of representation, only one line is used to represent the bus 104 in FIG. 4, but this does not mean that there is only one bus or only one type of bus.

The PSE chip 102 is connected to the level-1 power supply port 103. The PSE chip 102 is configured to detect whether the level-1 power supply port 103 is connected to a valid PD, and control, based on a detection result, a power source to connect to or disconnect from the level-1 power supply port 103 to power on or off the level-1 power supply port 103.

The power sourcing equipment 10 may further include a memory (not shown). The memory may be integrated into the processor 101, or may be independently disposed. The memory may be a volatile memory such as a random access memory (RAM). The memory may alternatively be a non-volatile memory such as a flash memory, a hard disk drive (HDD), or a solid-state drive (SSD).

If the processor 101 is the CPU, the memory may be further configured to store a program instruction, and the memory is the non-volatile memory. The processor 101 executes the program instruction stored in the memory to execute the power supply management method provided in the embodiments of the present disclosure.

If the processor 101 is the NP, the processor 101 executes the power supply management method provided in the embodiments of the present disclosure.

The level-1 powered device 21 may include a plurality of level-2 power supply ports, that is, include two or more level-2 power supply ports. For example, in FIG. 4, the level-1 powered device 21 includes the four level-2 power supply ports 205 to 208. In the level-1 powered device 21, the detection control module 202 and the power supply control module 203 are connected to each of the level-2 power supply ports 205 to 208.

In a possible implementation, as shown in FIG. 4, the detection control module 202 includes a detection switch and a detection controller. The detection switch is a single pole, multiple throw switch, and may be implemented using a metal-oxide-semiconductor field-effect transistor (MOSFET), a relay, an opto-isolator, or a triode. A quantity of throws in "single pole, multiple throw" is set based on a quantity of the level-2 power supply ports of the level-1 powered device 21. The detection switch is configured to connect the detection controller to or disconnect the detection controller from any level-2 power supply port of the level-1 powered device 21. The detection controller is configured to control the detection switch to be turned on or off. The detection controller further includes a circuit that provides a PoE protocol-compliant detection function, and the circuit is configured to detect whether each level-2 power supply port of the level-1 powered device 21 is connected to a valid PD. Optionally, the detection controller further includes a physical layer classification function. As shown in FIG. 4, the detection switch is a single pole, four throw switch. The detection switch can connect the detection controller to only one of the power supply ports 205 to 208 at any time. For example, at a moment 1, the detection switch connects the detection controller to the power supply port 205, at a moment 2, the detection switch disconnects the detection controller from the power supply port 205, and connects the detection controller to the power supply port 206.

Figure 5:
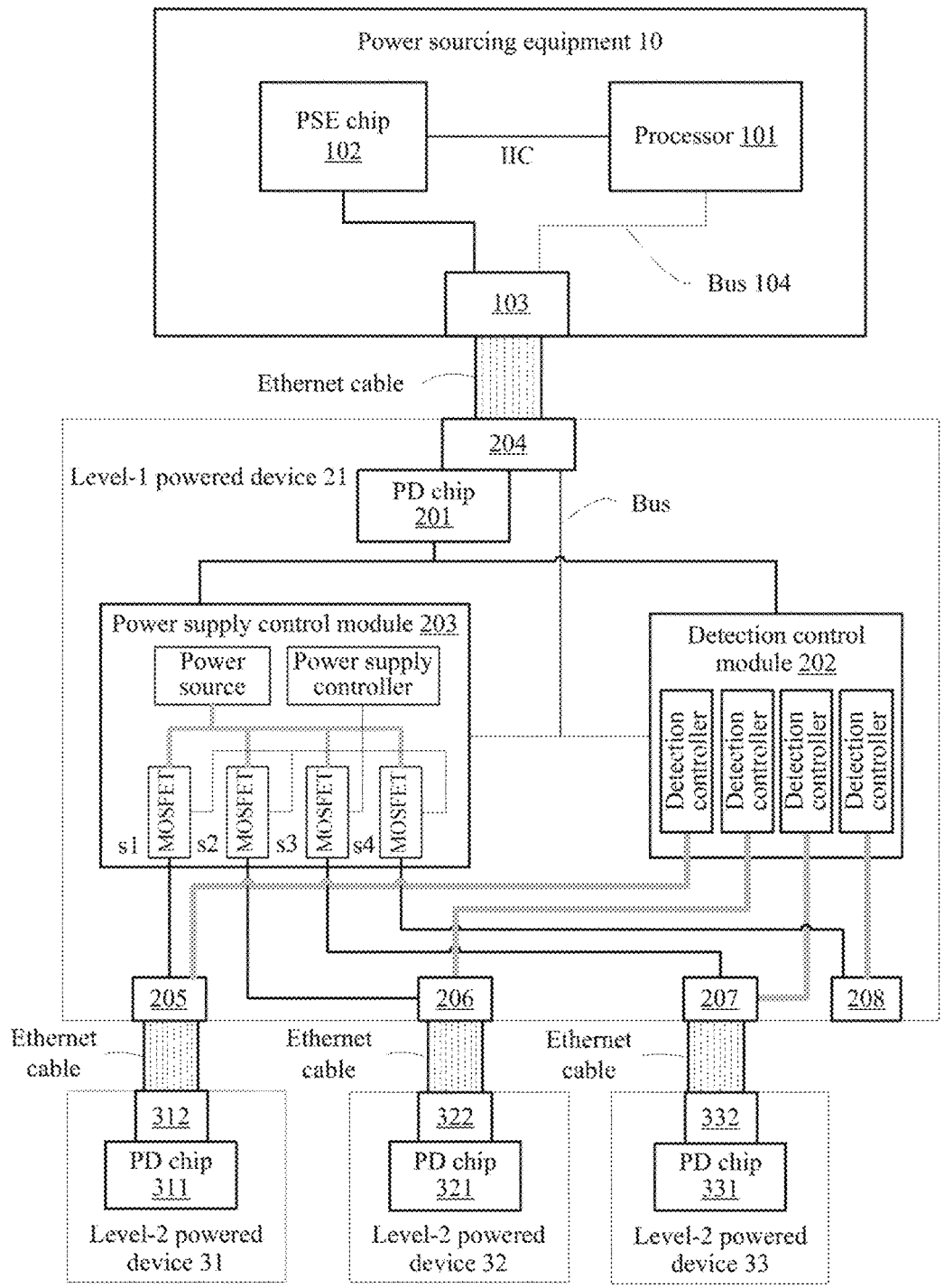
FIG. 5 is a schematic diagram of another device structure and connection relationship according to an embodiment of the present disclosure.

In another possible implementation, as shown in FIG. 5, the detection control module 202 includes detection controllers of a same quantity as that of the level-2 power supply ports of the level-1 powered device. One detection controller is configured for each level-2 power supply port. Each detection controller includes the PoE protocol-compliant detection function, and the function is used to detect whether each level-2 power supply port is connected to a valid PD. Optionally, each detection controller further includes a physical layer classification function. As shown in FIG. 5, the detection control module 202 includes four detection controllers, and each detection controller is connected to one level-2 power supply port.

The power supply control module 203 includes a power supply controller and power supply switches and current feedback circuits (not shown in FIG. 4/FIG. 5), where a quantity of the power supply switches and a quantity of the current feedback circuits are the same as that of the level-2 power supply ports of the level-1 powered device. The power supply switch is configured to connect a power source of the level-1 powered device 21 to or disconnect a power source of the level-1 powered device 21 from one or more level-2 power supply ports of the level-1 powered device 21. The power supply switch may be implemented using the MOSFET, the relay, the opto-isolator, or the triode. For example, in the figures, the power supply switch is implemented using the MOSFET. The power supply controller is configured to control the power supply switches to be turned on or off. A current feedback circuit of each level-2 power supply port is configured to monitor a magnitude of a current on the level-2 power supply port in order to detect whether the magnitude of the current on the level-2 power supply port exceeds a current threshold. The power supply controller is further configured to set a current threshold for each level-2 power supply port, to control a supply power of each level-2 power supply port.

As shown in FIG. 4 and FIG. 5, the power supply control module 203 includes four power supply switches (s1 to s4). The power supply controller controls the power supply switches s1 to s4 to be turned on or off to make one or more of the power supply ports 205 to 208 connect to or disconnect from the power source of the level-1 powered device 21. For example, at the moment 1, the power supply switch s1 and the power supply switch s2 are turned on to connect the power source of the level-1 powered device 21 to the power supply port 205 and the power supply port 206, respectively such that the power source of the level-1 powered device 21 supplies electricity to the power supply port 205 and the power supply port 206.

In the detection control module 202 shown in FIG. 4, only one detection controller needs to be configured to implement detection, classification, and the like on a plurality of level-2 power supply ports. This improves utilization of the detection controller and can reduce device costs. In the detection control module 202 shown in FIG. 5, one detection controller is configured for each level-2 power supply port such that detection can be performed on the plurality of level-2 power supply ports concurrently, shortening a detection time and improving detection efficiency.

The detection controller may be implemented using a processor and a detection circuit of the level-1 powered device 21. The detection controller may alternatively be implemented using a hardware chip and a detection circuit.

The hardware chip and the detection circuit may be disposed separately or integrated together. Optionally, if the detection controller further supports physical layer classification, the detection controller further includes a classification circuit. The detection circuit is a circuit that provides the PoE protocol-compliant detection function, and the classification circuit is a circuit that provides the PoE protocol-compliant physical layer classification function. It can be understood that the detection circuit and the classification circuit may alternatively be directly implemented using a PSE chip.

The power supply controller may be implemented using the processor of the level-1 powered device 21, or may be implemented using the hardware chip.

The hardware chip implementing the detection controller and the power supply controller may be two separate hardware chips or one hardware chip. The hardware chip may be an application-specific integrated circuit (ASIC), a programmable logic device (PLD) or a combination thereof. The PLD may be a complex PLD (CPLD), a field-programmable gate array (FPGA), a generic array logic (GAL), or any combination thereof.

In this embodiment of the present disclosure, the PSE chip 102 may be one channel in a multi-channel PSE chip, or may be a single-channel PSE chip.

With reference to the device structures and connection relationships shown in FIG. 4 and FIG. 5, the following describes the power supply management method provided in the embodiments of the present disclosure using an example in which the power sourcing equipment 10 performs power supply control and power management on the level-1 powered device 21 and the level-2 powered devices connected to the level-1 powered device 21.

Figure 6:
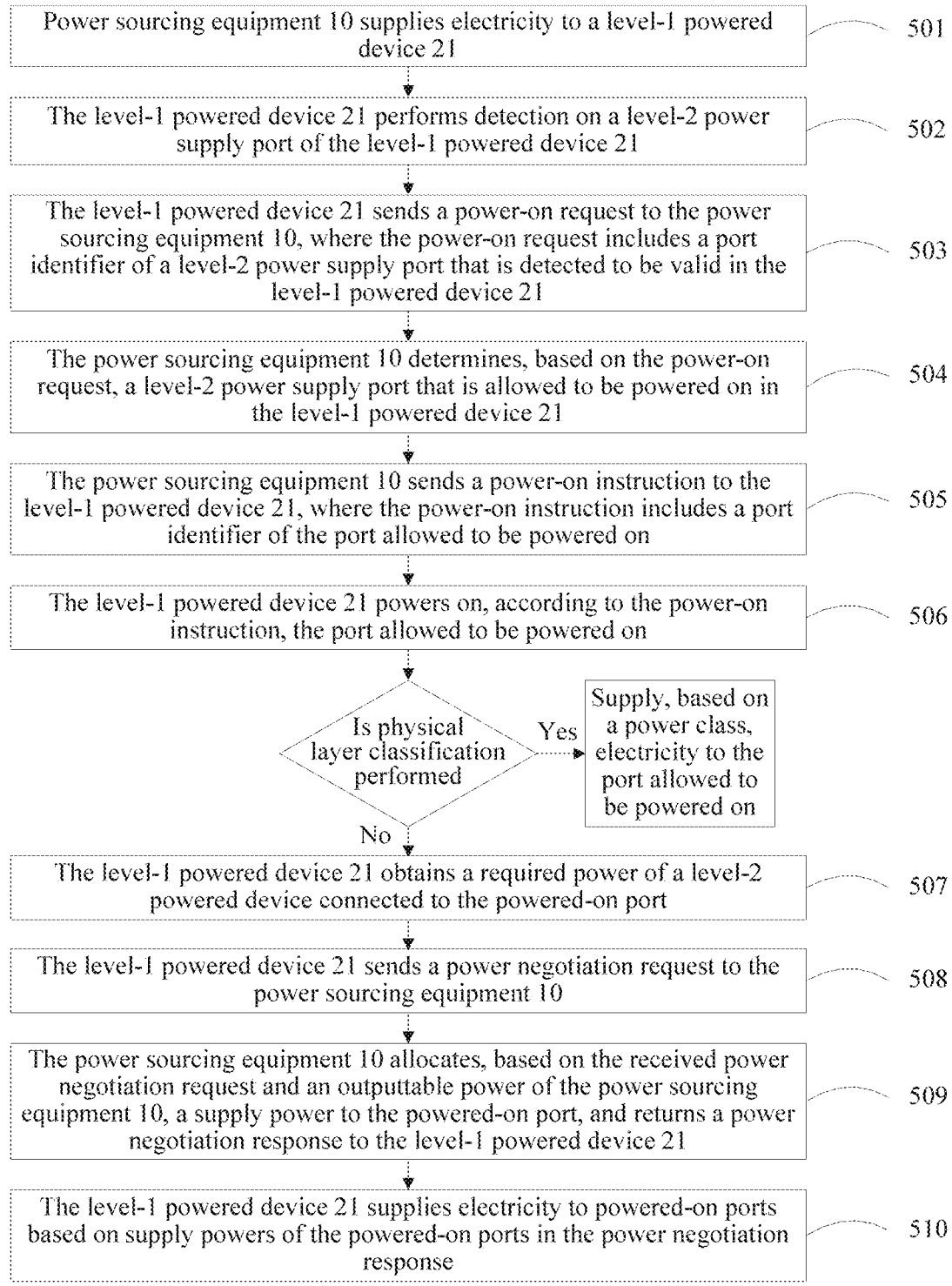
FIG. 6 is a schematic flowchart of another power supply management method according to an embodiment of the present disclosure.

FIG. 6 is a schematic flowchart of another power supply management method according to an embodiment of the present disclosure. As shown in FIG. 6, the method includes the following steps 501 to 511.

Step 501. The power sourcing equipment 10 supplies electricity to the level-1 powered device 21.

Before the power sourcing equipment 10 supplies electricity to the level-1 powered device 21, the power sourcing equipment 10 performs detection on the level-1 power supply port 103, connected to the level-1 powered device 21, of the power sourcing equipment 10 to determine that the level-1 powered device 21 is a valid PD.

The power sourcing equipment 10 may send a detection voltage to the level-1 power supply port 103, and obtain a detection impedance of the level-1 power supply port 103 (namely, an impedance of the level-1 powered device 21 connected to the level-1 power supply port 103) based on the detection voltage and a current detected on the level-1 power supply port 103. The power sourcing equipment 10 may alternatively send a detection current to the level-1 power supply port 103, and obtain a detection impedance of the level-1 power supply port 103 (namely, an impedance of the level-1 powered device 21) based on the detection current and a voltage detected on the level-1 power supply port 103.

Then, the power sourcing equipment 10 determines, based on the detection impedance of the level-1 power supply port 103, whether the level-1 power supply port 103 is connected to a valid PD (that is, determines whether the level-1 powered device 21 is a valid PD). When the detection impedance of the level-1 power supply port 103 is within a preset range, the level-1 powered device 21 is a valid PD. When the detection impedance of the level-1 power supply port 103 is not within a preset range, the level-1 powered device 21 is not a valid PD.

After determining that the level-1 powered device 21 is a valid PD, the power sourcing equipment 10 (the PSE chip 102) may immediately obtain a power class (for example, class 3) of the level-1 powered device 21 through physical layer classification, and power on and supply electricity to the level-1 powered device 21 based on the power class of the level-1 powered device 21.

Power classes defined in a standard are classes from 0 to 4 (class 0 to class 4). When the power class is class 4, the PSE provides a maximum power, and a power output by the PSE is approximately 30 watts (W). In the standard, each power class corresponds to a required power of the PD and a supply power of the PSE, where the supply power of the PSE is not less than a sum of the required power of the PD and a default line loss.

Alternatively, after determining that the level-1 powered device 21 is a valid PD, the power sourcing equipment 10 may first power on the level-1 power supply port 103, that is, power on the level-1 powered device 21, and then negotiate with the powered-on level-1 powered device 21 through data link layer classification, for example, using a Link Layer Discovery Protocol (LLDP) packet to obtain a required power of the level-1 powered device 21, for example, 11 W. Then, the power sourcing equipment 10 supplies electricity to the level-1 powered device 21 based on the required power of the level-1 powered device. The required power negotiated through data link layer classification may be any power value, and is not limited to a required power corresponding to the power class obtained through physical layer classification.

The LLDP provides a standard link layer discovery manner, in which information of a local device, such as a capability, a management address, a device identifier, and an interface identifier, may be organized into different type-length-values (TLVs), encapsulated into a LLDP data unit (LLDPDU), and notified to a peer end.

After the power sourcing equipment 10 supplies electricity to the level-1 powered device 21, the level-1 powered device 21 enters a normal working state. Further, the PD chip 201 of the level-1 powered device 21 extracts electricity from the power sourcing equipment 10, and converts the electricity to electricity meeting a voltage requirement of the level-1 powered device 21 to supply electricity to components of the level-1 powered device 21, and the level-1 powered device 21 starts to work normally.

The level-1 powered device 21 may communicate with the power sourcing equipment 10 using a Data Link Layer Protocol packet such as an LLDP packet to send information, such as a port identifier and a port priority of the level-2 power supply port of the level-1 powered device 21, to the power sourcing equipment 10.

Step 502. The level-1 powered device 21 performs detection on a level-2 power supply port of the level-1 powered device 21.

After the level-1 powered device 21 extracts electricity from the power sourcing equipment 10 and works normally, the level-1 powered device 21 performs detection on all the level-2 power supply ports (205 to 208) of the level-1 powered device 21, and obtains detection results of the level-2 power supply ports.

For example, the level-1 powered device 21 performs detection on the level-2 power supply port 205. The level-1 powered device 21 may send a detection voltage to the level-2 power supply port 205, and obtain a detection impedance of the level-2 power supply port 205 (namely, an impedance of the level-2 powered device 31 connected to the level-2 power supply port 205) based on the detection voltage and a current detected on the level-2 power supply port 205.

Then, the level-1 powered device 21 determines, based on the detection impedance of the level-2 power supply port 205, whether the level-2 power supply port 205 is connected to a valid PD (that is, determines whether the level-2 powered device 31 is a valid PD), and obtains a detection result of the level-2 power supply port 205. When the detection impedance of the level-2 power supply port 205 is within a preset range, the level-2 powered device 31 is a valid PD, that is, the level-2 power supply port 205 is detected to be valid. When the detection impedance of the level-2 power supply port 205 is not within a preset range, the level-2 powered device 31 is not a valid PD, that is, the level-2 power supply port 205 is detected to be invalid.

When the level-1 powered device has a plurality of level-2 power supply ports, the level-1 powered device may separately perform detection on the level-2 power supply ports of the level-1 powered device in the foregoing manner.

In the level-1 powered device 21 shown in FIG. 4, only one detection controller is disposed in the detection control module 202. Therefore, the level-1 powered device 21 needs to perform detection on the level-2 power supply ports 205 to 208 in sequence (for example, in ascending order of port number or in descending order of port number) in the foregoing manner.

In the level-1 powered device 21 shown in FIG. 5, one detection controller is disposed in the detection control module 202 in correspondence to each level-2 power supply port. Therefore, the level-1 powered device 21 may separately perform detection on the level-2 power supply ports in any manner, for example, in parallel, in sequence, or out of order.

With reference to the example in FIG. 4 or FIG. 5, the level-1 powered device 21 separately performs detection on the level-2 power supply ports 205 to 208 in the foregoing manner (for example, sequentially performs detection on the level-2 power supply ports 205 to 208 in ascending order of port number in FIG. 4, or concurrently performs detection on the level-2 power supply ports 205 to 208 in FIG. 5), and obtains detection results of the level-2 power supply ports. For example, in this embodiment of the present disclosure, the level-2 power supply port 205 is detected to be valid (the level-2 powered device 31 is a valid PD), the level-2 power supply port 206 is detected to be valid (the level-2 powered device 32 is a valid PD), the level-2 power supply port 207 is detected to be valid (the level-2 powered device 33 is a valid PD), and the level-2 power supply port 208 is detected to be invalid (the level-2 power supply port 208 is not connected to any device).

Optionally, after performing detection on one level-2 power supply port and determining that the level-2 power supply port is detected to be valid, the level-1 powered device 21 may immediately obtain, through physical layer classification, a power class of a level-2 powered device connected to the level-2 power supply port.

Still referring to the foregoing example, after performing detection on the level-2 power supply port 205 and determining that the level-2 power supply port 205 is detected to be valid, the level-1 powered device 21 immediately obtains, through physical layer classification, a power class of the level-2 powered device 31 connected to the level-2 power supply port 205. Further, the level-1 powered device 21 (the classification circuit in the detection control module 202) inputs a classification voltage to the level-2 power supply port 205, and measures a classification current, to obtain the power class of the level-2 powered device 31 connected to the level-2 power supply port 205 (also referred to as a power class of the level-2 power supply port 205). Physical layer classification in this embodiment of the present disclosure complies with physical layer classification specified in the PoE standard.

A process of obtaining a power class of another level-2 power supply port through physical layer classification is similar to the process of obtaining the power class of the level-2 powered device 31 connected to the level-2 power supply port 205, and details are not repeated herein.

Step 503. The level-1 powered device 21 sends a power-on request to the power sourcing equipment 10, where the power-on request includes a port identifier of a level-2 power supply port that is detected to be valid in the level-1 powered device 21.

For ease of description, the level-2 power supply port that is detected to be valid in the level-1 powered device 21 is briefly referred to as a "valid port" in the following.

The level-1 powered device 21 may send the power-on request to the power sourcing equipment 10 using the Data Link Layer Protocol packet such as the LLDP packet, where the power-on request includes the port identifier of the valid port.

Further, a new TLV, for example, a port power-on request TLV, may be added to carry the port identifier of the valid port. The level-1 powered device 21 encapsulates the port power-on request TLV into an LLDPDU to obtain the power-on request, and sends the power-on request to the power sourcing equipment 10.

There may be a plurality of implementations of sending the power-on request to the power sourcing equipment 10 by the level-1 powered device 21.

In a first implementation, the level-1 powered device 21 sends the power-on request after detection on all the level-2 power supply ports of the level-1 powered device has been completed and at least one level-2 power supply port is detected to be valid. The power-on request may include only the port identifier of the valid port. The power-on request may also include a correspondence between a port identifier and a detection result of each level-2 power supply port.

In a second implementation, each time detection on one level-2 power supply port is completed, the level-1 powered device 21 sends a detection report to the power sourcing equipment 10, where the detection report includes a correspondence between a port identifier and a detection result of the level-2 power supply port. After detection on all the level-2 power supply ports has been completed, the level-1 powered device 21 sends the power-on request to the power sourcing equipment 10. After receiving the power-on request, the power sourcing equipment 10 determines, based on the previously received detection reports, a level-2 power supply port that is allowed to be powered on.

In a third implementation, each time detection on one level-2 power supply port is completed, and the level-2 power supply port is detected to be valid, the level-1 powered device 21 sends a detection report to the power sourcing equipment 10, where the detection report includes a port identifier of the level-2 power supply port. After detection on all the level-2 power supply ports has been completed, the level-1 powered device 21 sends the power-on request to the power sourcing equipment 10. After receiving the power-on request, the power sourcing equipment 10 determines, based on the previously received detection reports, a level-2 power supply port that is allowed to be powered on.

The port identifier includes a port address (for example, an Internet Protocol (IP) address and/or a Media Access Control (MAC) address), a port number, or the like.

In the first implementation, the power-on request is sent after detection on all the level-2 power supply ports has been completed. This can reduce interactions between the level-1 powered device 21 and the power sourcing equipment 10, and improve communication efficiency.

In the second and the third implementations, a detection report needs to be sent for a plurality of times, and the power-on request needs to be sent such that the level-1 powered device 21 and the power sourcing equipment 10 interact with each other for many times, consuming communication resources and leading to relatively low efficiency.

In this embodiment of the present disclosure, the first implementation is used as an example for description in the following, but is not intended to limit the present disclosure.

Still referring to the example in step 502, after performing detection on all the power supply ports 205 to 208, the level-1 powered device 21 determines that each of the power supply ports 205 to 207 is connected to a valid PD, and the power supply port 208 is not connected to a valid PD. The level-1 powered device 21 sends the power-on request to the power sourcing equipment 10, where the power-on request includes port numbers of the level-2 power supply ports 205 to 207.

Optionally, the power-on request further includes power information of each valid port. Further, in step 502, after the level-1 powered device 21 performs detection on one level-2 power supply port and determines that the level-2 power supply port is detected to be valid, if the level-1 powered device 21 obtains, through physical layer classification, a power class of a level-2 powered device connected to the level-2 power supply port, the power-on request sent to the power sourcing equipment 10 further includes power information of the level-2 power supply port. The power information may be a power class, or may be a required power corresponding to the power class (refer to a PD required power Pclass_PD corresponding to each power class in the PoE standard).

Step 504. The power sourcing equipment 10 determines, based on the power-on request, a level-2 power supply port that is allowed to be powered on in the level-1 powered device 21.

For ease of description, the level-2 power supply port that is allowed to be powered on in the level-1 powered device 21 is briefly referred to as a "port allowed to be powered on" in the following.

After receiving the power-on request from the level-1 powered device 21, the power sourcing equipment 10 first obtains port identifiers of all valid ports from the power-on request.

If the power-on request further includes power information of the valid ports, the power information of the valid ports is also obtained. After obtaining power information of a valid port, the power sourcing equipment 10 can obtain a required power of the valid port.

When the power-on request does not include the power information of the valid ports, the power sourcing equipment 10 determines, based on an outputtable power of the power sourcing equipment 10 and all the valid ports in the level-1 powered device, the port allowed to be powered on. Further, the power sourcing equipment 10 obtains, based on a power-on power of the level-1 powered device 21, for example, 3 W, and all the valid ports, a sum of power-on powers required by all the valid ports, and then determines, from all the valid ports based on the outputtable power of the power sourcing equipment 10, for example, 18 W, the port allowed to be powered on. Further, when the outputtable power of the power sourcing equipment 10 meets the sum of the power-on powers required by all the valid ports, all the valid ports are ports allowed to be powered on, or when the outputtable power of the power sourcing equipment does not meet the sum of the power-on powers required by all the valid ports, the port allowed to be powered on is determined from all the valid ports based on a power supply policy. In this way, the determined port allowed to be powered on can be powered on based on a power-on power, and after the determined port allowed to be powered on is powered on, the level-1 powered device 21 negotiates a required power through data link layer classification. The outputtable power of the power sourcing equipment 10 meets the sum of the power-on powers required by all the valid ports, means that, the outputtable power of the power sourcing equipment 10 is great than or equal to the sum of the power-on powers required by all the valid ports. The outputtable power of the power sourcing equipment does not meet the sum of the power-on powers required by all the valid ports, means that, the outputtable power of the power sourcing equipment is less than the sum of the power-on powers required by all the valid ports.

When the power-on request includes the power information of the valid ports, that is, the level-1 powered device 21 has performed physical layer classification, the power sourcing equipment 10 determines, from all the valid ports based on the outputtable power of the power sourcing equipment 10 and the power information of the valid ports, the port allowed to be powered on. Further, when the outputtable power of the power sourcing equipment 10 meets a sum of required powers of all the valid ports, all the valid ports are ports allowed to be powered on, or when the outputtable power of the power sourcing equipment does not meet a sum of required powers of all the valid ports, the port allowed to be powered on is determined from all the valid ports based on a power supply policy. In this way, the determined port allowed to be powered on can be directly powered on and supplied with electricity based on a required power.

Certainly, when the outputtable power of the power sourcing equipment does not meet the sum of the required powers of all the valid ports, the power sourcing equipment may determine, randomly from all the valid ports instead of based on the power supply policy, the port allowed to be powered on.

In this embodiment of the present disclosure, the power-on power (also referred to as a default power) of the level-1 powered device 21 is a minimum power that the level-1 powered device 21 can output to each valid port. The power-on power may be preset, or may be a minimum power output by the PSE based on a minimum current specified by the PoE standard. In this embodiment of the present disclosure, the power sourcing equipment 10 may pre-obtain and store the power-on power of the level-1 powered device 21.

In this embodiment of the present disclosure, the outputtable power of the power sourcing equipment 10 is a power based on which the power sourcing equipment 10 can supply electricity to the level-2 powered devices of the level-1 powered device 21.

The power supply policy includes any one or a combination of the following
  in ascending order of port number,
  in descending order of port number,
  in descending order of port priority, and
  based on a power supply time segment.

The power sourcing equipment 10 may determine, from all the valid ports based on the port numbers of the valid ports, for example, in ascending order of port number, the port allowed to be powered on. The power sourcing equipment 10 may alternatively determine, from all the valid ports based on port priorities of the valid ports, for example, in descending order of priority, the port allowed to be powered on.

Optionally, in some scenarios, a power supply time segment is configured for each level-2 power supply port level of the level-1 powered device 21. The power sourcing equipment 10 stores power supply time segments of the level-2 power supply ports of the level-1 powered device 21.

Further, the power sourcing equipment 10 may determine, based on power supply time segments of the valid ports, a valid port that needs to be supplied with electricity currently. If the outputtable power of the power sourcing equipment 10 meets a sum of power-on powers or required powers of all valid ports that need to be supplied with electricity currently, all the valid ports that need to be supplied with electricity currently are ports allowed to be powered on. If the outputtable power of the power sourcing equipment 10 does not meet a sum of power-on powers or required powers of all valid ports that need to be supplied with electricity currently, the port allowed to be powered on is then determined based on port priorities or port numbers from the valid ports that need to be supplied with electricity currently.

Still referring to the example in step 503, the valid ports of the level-1 powered device 21 are the level-2 power supply ports 205 to 207. Assuming that the power-on power of the level-1 powered device 21 is 3 W, a sum of power-on powers required by all the valid ports is 9 W.

If the outputtable power of the power sourcing equipment 10 is 20 W, the outputtable power of the power sourcing equipment 10 meets the sum of the power-on powers required by all the valid ports (the level-2 power supply ports 205 to 207), and the level-2 power supply ports 205 to 207 are all ports allowed to be powered on.

If the outputtable power of the power sourcing equipment 10 is 8 W, the outputtable power of the power sourcing equipment 10 does not meet the sum of the power-on powers required by all the valid ports (the level-2 power supply ports 205 to 207). The power sourcing equipment determines, in descending order of port priorities of the valid ports from all the valid ports, the port allowed to be powered on. For example, a port priority of the power supply port 205 is 6, a port priority of the power supply port 206 is 3, a port priority of the power supply port 207 is 4, and a port priority of the power supply port 208 is 1. A larger value indicates a higher priority. In this case, the power sourcing equipment 10 determines, in descending order of priority, the level-2 power supply ports 205 and 207 as ports allowed to be powered on.

Alternatively, it is assumed that a required power of the level-2 power supply port 205 is 3.84 W (a corresponding power class is class 1), a required power of the level-2 power supply port 206 is 6.49 W (a corresponding power class is class 2), and a required power of the level-2 power supply port 207 is 13 W (a corresponding power class is class 3).

If the outputtable power of the power sourcing equipment 10 is 30 W, the outputtable power of the power sourcing equipment 10 meets a sum of required powers of all the valid ports (the level-2 power supply ports 205 to 207), and the level-2 power supply ports 205 to 207 are all ports allowed to be powered on.

If the outputtable power of the power sourcing equipment 10 is 20 W, the outputtable power of the power sourcing equipment 10 does not meet a sum of required powers of all the valid ports (the level-2 power supply ports 205 to 207). The power sourcing equipment determines, in descending order of port priorities of the valid ports from all the valid ports, the port allowed to be powered on. It is assumed that a port priority of the level-2 power supply port 205 is 6, a port priority of the level-2 power supply port 206 is 3, a port priority of the level-2 power supply port 207 is 4, and a port priority of the level-2 power supply port 208 is 1. A larger value indicates a higher priority. In this case, the power sourcing equipment 10 determines, in descending order of priority, the level-2 power supply ports 205 and 207 as ports allowed to be powered on.

Step 505. The power sourcing equipment 10 sends a power-on instruction to the level-1 powered device 21, where the power-on instruction includes a port identifier of the port allowed to be powered on.

The power sourcing equipment 10 may send the power-on instruction using the LLDP packet, where the power-on instruction includes the port identifier of the port allowed to be powered on. Further, a new TLV, for example, a power-on allocation TLV, may be added to carry the port identifier of the port allowed to be powered on. The power sourcing equipment 10 encapsulates the power-on allocation TLV into an LLDPDU to obtain the power-on instruction, and sends the power-on instruction to the level-1 powered device 21.

Still referring to the example in step 504, if the power-on instruction includes port identifiers of the level-2 power supply ports 205 to 207, the level-1 powered device 21 may determine that the level-2 power supply ports 205 to 207 are ports allowed to be powered on.

Step 506. The level-1 powered device 21 powers on, according to the power-on instruction, the port allowed to be powered on.

After receiving the power-on instruction, the level-1 powered device 21 powers on, based on the port identifier of the port allowed to be powered on in the power-on instruction, the port allowed to be powered on.

Further, the level-1 powered device 21 instructs, according to the power-on instruction, the power supply control module 203 to connect to the port allowed to be powered on and output electricity based on the power-on power.

Still referring to the example in step 505, the level-1 powered device 21 obtains, from the power-on instruction, the port identifier of the port allowed to be powered on, namely, the port identifiers of the level-2 power supply ports 205 to 207. Then, the power supply controller in the power supply control module 203 turns on the power supply switches s1 to s3, that is, connects the power source to the level-2 power supply ports 205 to 207, to power on the level-2 power supply ports 205 to 207.

If the level-1 powered device 21 has obtained power classes of the valid ports through physical layer classification in step 502, after powering on the port allowed to be powered on, the level-1 powered device 21 supplies, based on a power class of the port allowed to be powered on, electricity to a level-2 powered device connected to the port allowed to be powered on. The level-1 powered device 21 obtains, based on the power class of the port allowed to be powered on, a supply power of the port allowed to be powered on (refer to a PSE output power Pclass corresponding to each power class in the PoE standard), and then supplies, based on the supply power of the port allowed to be powered on, electricity to the port allowed to be powered on.

Further, a current threshold corresponding to the port allowed to be powered on may be set in the power supply control module 203 to control the supply power. Still referring to the foregoing example, the level-1 powered device 21 obtains a supply power of the level-2 power supply port 205 based on the power class of the level-2 power supply port 205, and sets, in the power supply control module 203, a current threshold corresponding to the level-2 power supply port 205, to control a supply power of the level-2 powered device 31. The level-1 powered device 21 obtains a supply power of the level-2 power supply port 206 based on a power class of the level-2 power supply port 206, and sets, in the power supply control module 203, a current threshold corresponding to the level-2 power supply port 206, to control a supply power of the level-2 powered device 32. The level-1 powered device 21 obtains a supply power of the level-2 power supply port 207 based on a power class of the level-2 power supply port 207, and sets, in the power supply control module 203, a current threshold corresponding to the level-2 power supply port 207, to control a supply power of the level-2 powered device 33.

If the level-1 powered device 21 has not obtained power classes of the valid ports through physical layer classification, after powering on the port allowed to be powered on, the level-1 powered device 21 proceeds to step 507 to negotiate, through data link layer classification, a supply power of the port allowed to be powered on.

After being powered on, the port allowed to be powered on has become a powered-on port. In the following, the port allowed to be powered on is also referred to as the powered-on port.

Step 507. The level-1 powered device 21 obtains a required power of a level-2 powered device connected to the powered-on port.

After powering on the port allowed to be powered on in step 506, the level-1 powered device 21 communicates, through data link layer classification (Data Link Layer classification), for example, using the LLDP, with the level-2 powered device connected to the powered-on port, to obtain the required power of the level-2 powered device connected to the powered-on port, that is, a required power of the powered-on port.

Still referring to the example in step 506, the level-1 powered device 21 communicates, using the LLDP, with the level-2 powered device 31 connected to the level-2 power supply port 205, to negotiate a required power of the level-2 powered device 31 (that is, a required power of the level-2 power supply port 205). The level-1 powered device 21 communicates, using the LLDP, with the level-2 powered device 32 connected to the level-2 power supply port 206, to negotiate a required power of the level-2 powered device 32 (that is, a required power of the level-2 power supply port 206). The level-1 powered device 21 communicates, using the LLDP, with the level-2 powered device 33 connected to the level-2 power supply port 207, to negotiate a required power of the level-2 powered device 33 (that is, a required power of the level-2 power supply port 207).

The level-1 powered device 21 may store a correspondence between the port identifier of the powered-on port and the required power of the powered-on port.

The level-1 powered device 21 may also store a correspondence between an identifier and a required power of a level-2 powered device. The level-1 powered device 21 further stores a correspondence between a port identifier of a level-2 power supply port of the level-2 powered device and the identifier of the level-2 powered device. The two correspondences may be stored separately, or may be stored in one table.

Step 508. The level-1 powered device 21 sends a power negotiation request to the power sourcing equipment 10.

The power negotiation request includes the correspondence between the port identifier and the required power of the powered-on port.

The level-1 powered device 21 may send the power negotiation request to the power sourcing equipment 10 using the Data Link Layer Protocol packet such as the LLDP packet. Further, a new TLV, for example, a power negotiation TLV, may be added to carry the correspondence between the port identifier and the required power of the powered-on port. The level-1 powered device 21 encapsulates the power negotiation TLV into an LLDPDU to obtain the power negotiation request, and sends the power negotiation request to the power sourcing equipment 10.

Step 509. The power sourcing equipment 10 allocates, based on the received power negotiation request and an outputtable power of the power sourcing equipment 10, a supply power to the powered-on port, and returns a power negotiation response to the level-1 powered device 21.

After receiving the power negotiation request, the power sourcing equipment 10 obtains, from the power negotiation request, required powers corresponding to powered-on ports, and stores the correspondence between the port identifier and the required power of the powered-on port. Then, the power sourcing equipment 10 performs power allocation (to be specific, allocates supply powers to the powered-on ports) based on the outputtable power of the power sourcing equipment 10 and the required powers of all the powered-on ports. Then, the power sourcing equipment generates the power negotiation response, where the power negotiation response includes the supply powers allocated to the powered-on ports. Further, a new TLV, for example, a power allocation TLV, may be added to carry a correspondence between the port identifier and the supply power of the powered-on port. Then, the power sourcing equipment 10 returns the power negotiation response to the level-1 powered device 21.

Further, that the power sourcing equipment 10 performs power allocation based on the outputtable power of the power sourcing equipment 10 and the required powers of all the powered-on ports includes When the outputtable power of the power sourcing equipment 10 meets a sum of the required powers of all the powered-on ports, the supply powers are allocated based on the required powers of the powered-on ports. When the outputtable power of the power sourcing equipment 10 does not meet a sum of the required powers of all the powered-on ports, the power sourcing equipment 10 allocates the supply powers to the powered-on ports based on a power allocation policy.

The power allocation policy includes any one or more of the following
   in ascending order of required power,
   in descending order of required power,
   in descending order of port priority,
   in ascending order of port number, and
   in descending order of port number.

The power sourcing equipment 10 may allocate the supply powers based on only any one of the foregoing policies.

The power sourcing equipment 10 may alternatively allocate the supply powers based on any combination of the foregoing policies. For example, the power sourcing equipment may first allocate supply powers in ascending order of required power, that is, first allocate a supply power to a powered-on port with a low required power, and then allocate a power to a powered-on port with a high required power (certainly, the supply powers may alternatively be allocated in descending order of required power). Then, for powered-on ports with a same required power, the power sourcing equipment allocates supply powers in descending order of port priority, that is, first allocates a supply power to a powered-on port with a high port priority, and then allocates a supply power to a powered-on port with a low port priority. Alternatively, for powered-on ports with a same required power, the power sourcing equipment allocates supply powers in ascending or descending order of port number.

For another example, the power sourcing equipment 10 first allocates supply powers in descending order of port priority, that is, first allocates a supply power to a powered-on port with a high port priority, and then allocates a supply power to a powered-on port with a low port priority. Then, for powered-on ports with a same priority, the power sourcing equipment 10 allocates supply powers in ascending order of power class, that is, first allocates a supply power to a powered-on port with a low power class, and then allocates a supply power to a powered-on port with a high power class. Alternatively, for powered-on ports with a same priority, the power sourcing equipment 10 allocates supply powers in ascending or descending order of port number.

For still another example, the power sourcing equipment 10 first allocates supply powers in ascending order of required power. Then, for powered-on ports with a same required power, the power sourcing equipment 10 allocates supply powers in descending order of port priority. If port priorities are also the same, the power sourcing equipment 10 allocates supply powers in ascending or descending order of port number.

Still referring to the example in step 507, it is assumed that the outputtable power of the power sourcing equipment 10 is 30 W, the powered-on ports are the level-2 power supply ports 205 to 207, a required power of the level-2 power supply port 205 is 5 W, a required power of the level-2 power supply port 206 is 10 W, and a required power of the level-2 power supply port 207 is 10 W. In this case, the outputtable power of the power sourcing equipment 10 meets a sum of the required powers of all the powered-on ports (the level-2 power supply ports 205 to 207), and the power sourcing equipment 10 allocates supply powers based on the required powers of the powered-on ports. Further, the power sourcing equipment 10 allocates a supply power of 5.5 W to the level-2 power supply port 205 based on the required power 5 W of the level-2 power supply port 205, the power sourcing equipment 10 allocates a supply power of 11 W to the level-2 power supply port 206 based on the required power 10 W of the level-2 power supply port 206, and the power sourcing equipment 10 allocates a supply power of 11 W to the level-2 power supply port 207 based on the required power 10 W of the level-2 power supply port 207.

In this embodiment of the present disclosure, a supply power is a power output by the PSE when the PSE supplies electricity to a PD, and the supply power is obtained based on a required power of the PD and a line loss.

For another example, it is assumed that the outputtable power of the power sourcing equipment 10 is 30 W, the powered-on ports are the level-2 power supply ports 205 to 207, a required power of the level-2 power supply port 205 is 12 W, a required power of the level-2 power supply port 206 is 10 W, and a required power of the level-2 power supply port 207 is 10 W. Obviously, the outputtable power of the power sourcing equipment 10 does not meet a sum of the required powers of all the powered-on ports. The power sourcing equipment 10 may allocate supply powers to the powered-on ports in descending order of port priority. It is assumed that a port priority of the level-2 power supply port 205 is 4, a port priority of the level-2 power supply port 206 is 3, and a port priority of the level-2 power supply port 207 is 6. A larger value indicates a higher priority. In this case, the power sourcing equipment 10 first allocates a supply power of 11 W to the level-2 power supply port 207, and then allocates a supply power of 13 W to the level-2 power supply port 205. Finally, the power sourcing equipment 10 may allocate a remaining supply power of 6 W (30 W 11 W 13 W) in the outputtable power to the level-2 power supply port 206 (that is, supply electricity to the level-2 power supply port 206 based on the supply power of 6 W), or may not allocate a supply power to the level-2 power supply port 206 (that is, supply electricity to the level-2 power supply port 206 still based on the power-on power of 3 W).

Step 510. The level-1 powered device 21 supplies electricity to powered-on ports based on supply powers of the powered-on ports in the power negotiation response.

After receiving the power negotiation response, the level-1 powered device supplies electricity to the powered-on ports based on the supply powers of the powered-on ports in the power negotiation response.

Further, the level-1 powered device 21 may set, based on the supply powers of the powered-on ports, current thresholds of power supply switches in the power supply control module 203 that are corresponding to the powered-on ports, to control the supply powers of the powered-on ports.

It can be understood that a voltage output by the power supply of the level-1 powered device 21 does not change. A magnitude of a current determines a power of output electricity, and a supply power can be controlled by setting a current threshold.

In an electricity extraction process of a level-2 powered device, if a current threshold of a connected level-2 power supply port is exceeded, and therefore a supply power of the power supply port is exceeded, a switch, in the power supply control module 203, corresponding to the level-2 power supply port is turned off, and power supply to the level-2 powered device is stopped.

Figure 7:
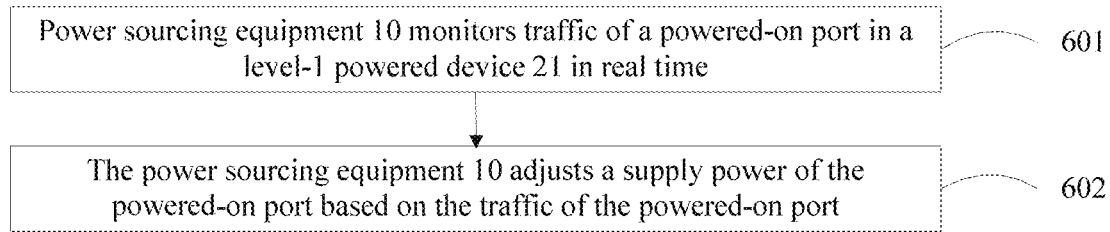
FIG. 7 is a schematic flowchart of still another power supply management method according to an embodiment of the present disclosure.

Further, based on the power supply management method shown in FIG. 6, referring to FIG. 7, after electricity is supplied to the powered-on ports, the power supply management method may further include the following steps.

Step 601. The power sourcing equipment 10 monitors traffic of a powered-on port in the level-1 powered device 21 in real time.

The power sourcing equipment 10 may monitor traffic of all the powered-on ports (that is, the powered-on level-2 powered devices) in the level-1 powered device 21 in real time, and collects statistics on traffic of each powered-on port.

The power sourcing equipment 10 may alternatively monitor traffic of one or more powered-on ports in real time according to a monitoring rule.

The monitoring rule is any one of the following:
Monitoring a port with a highest supply power;
Monitoring a port with a lowest supply power; and
Monitoring a port whose supply power is greater than a preset monitoring power.

The power sourcing equipment 10 may collect, based on a source address or a destination address of a data packet, statistics on data packets of a powered-on port that is monitored in real time, including data packets received from and sent to the powered-on port that is monitored in real time. The source address may be a source IP address and/or a source MAC address. The destination address may be a destination IP address and/or a destination MAC address.

Step 602. The power sourcing equipment 10 adjusts a supply power of the powered-on port based on the traffic of the powered-on port.

Within a preset monitoring time (for example, 2 minutes), if average traffic of one powered-on port (a level-2 powered device) that is monitored in real time is less than a preset traffic threshold (for example, 5 megabits per second (Mbit/s)), the power sourcing equipment 10 may reduce a supply power allocated to the powered-on port (the powered-on level-2 powered device), for example, reduce the supply power by half. After a period of time, if the traffic of the powered-on port increases and becomes greater than the preset traffic threshold, the power sourcing equipment 10 may restore the supply power of the powered-on port. In either process of reducing the supply power or restoring the supply power, the power sourcing equipment 10 may send a power adjustment instruction to the level-1 powered device 21, where the power adjustment instruction includes a port identifier and an adjusted supply power of the powered-on port. The level-1 powered device 21 may adjust an output current, and further, may adjust a current threshold of a power supply switch, in the power supply control module 203, corresponding to the powered-on port.

If the powered-on port has no traffic within the preset monitoring time, the power sourcing equipment 10 may reduce the supply power of the powered-on port, for example, reduce the supply power to the power-on power. The power sourcing equipment 10 may alternatively power off the powered-on port. Further, the power sourcing equipment 10 may send a power-off instruction to the level-1 powered device 21, where the power-off instruction includes the port identifier of the powered-on port. The level-1 powered device 21 may turn off the power supply switch, in the power supply control module 203, corresponding to the powered-on port.

If the powered-on port has been powered off, the power sourcing equipment 10 may keep the powered-on port in a powered-off state within preset power-off duration (for example, 10 minutes), and power on the powered-on port again after the preset power-off duration elapses. Further, the power sourcing equipment 10 may send a power-on instruction to the level-1 powered device 21, where the power-on instruction includes the port identifier of the powered-on port. The level-1 powered device 21 may turn on the power supply switch, in the power supply control module 203, corresponding to the powered-on port. After the powered-on port is powered on, the power sourcing equipment 10 continues to monitor the traffic of the powered-on port. If the powered-on port still has no traffic, the powered-on port may be powered off again (the power sourcing equipment 10 sends a power-off instruction to the level-1 powered device 21). If the traffic is greater than the preset traffic threshold, the supply power of the powered-on port may be restored (the power sourcing equipment 10 sends a power adjustment instruction to the level-1 powered device 21).

By sending a power-on instruction, a power-off instruction, and a power adjustment instruction to the level-1 powered device 21, the power sourcing equipment 10 may instruct the power supply control module of the level-1 powered device 21 to perform operations of power-on, power-off, supply power reduction, and supply power restoration. In this way, the supply power is adjusted in real time based on the traffic, increasing electricity resource utilization of the whole power supply management system, and improving overall performance of the power supply management system.

In this embodiment of the present disclosure, the example is used in which one-stage adjustment is performed on the supply power based on the preset traffic threshold. Certainly, in actual application, a plurality of traffic thresholds may be set to perform multi-stage adjustment on the supply power. An implementation principle thereof is the same as that described above, and is not repeated herein.

The foregoing describes, using one powered-on port as an example, a process of monitoring traffic in real time to perform power adjustment. Real-time traffic monitoring and supply power adjustment may be performed on another powered-on port at a same time as that on the one powered-on port according to the foregoing process.

The power sourcing equipment 10 provided in this embodiment of the present disclosure uses the level-1 powered device connected to the power sourcing equipment 10 and the level-2 powered device connected to the level-1 powered device as a whole, and performs power allocation and management such that the level-1 powered device does not need to support power negotiation, allocation, and management. This can reduce costs of the level-1 powered device, and improve power management efficiency.

Figure 8:
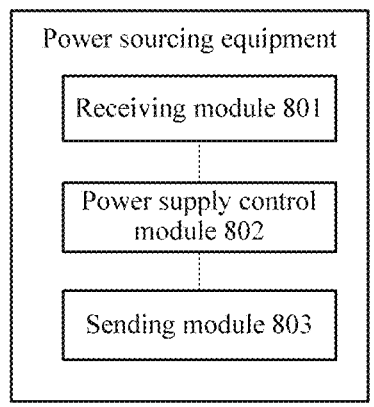
FIG. 8 is a schematic structural diagram of power sourcing equipment according to an embodiment of the present disclosure.

FIG. 8 shows power sourcing equipment according to an embodiment of the present disclosure. The power sourcing equipment is configured to implement the power sourcing equipment 10 in the power supply management methods provided in the embodiments of the present disclosure, and the power sourcing equipment includes a receiving module 801, a power supply control module 802, and a sending module 803.

The receiving module 801 is configured to receive a power-on request from a level-1 powered device, where the power-on request includes a port identifier of a level-2 power supply port that is detected to be valid in the level-1 powered device, and the level-1 powered device is connected to a level-1 power supply port of the power sourcing equipment, and extracts electricity from the level-1 power supply port.

The power supply control module 802 is configured to determine, based on the power-on request and an outputtable power of the power sourcing equipment, a level-2 power supply port that is allowed to be powered on in the level-1 powered device.

The sending module 803 is configured to send a power-on instruction to the level-1 powered device, where the power-on instruction includes a port identifier of the level-2 power supply port that is allowed to be powered on in the level-1 powered device, and the power-on instruction is used to instruct the level-1 powered device to power on the level-2 power supply port that is allowed to be powered on.

Optionally, the power supply control module 802 is configured to obtain, based on the power-on request, the level-2 power supply port that is detected to be valid, and when the outputtable power of the power sourcing equipment meets a sum of power-on powers required by all level-2 power supply ports that are detected to be valid in the level-1 powered device, determine all the level-2 power supply ports that are detected to be valid, as level-2 power supply ports that are allowed to be powered on, or when the outputtable power of the power sourcing equipment does not meet a sum of power-on powers required by all level-2 power supply ports that are detected to be valid in the level-1 powered device, determine, based on a power supply policy from all the level-2 power supply ports that are detected to be valid, the power supply port that is allowed to be powered on. The power sourcing equipment may further include a power management module.

The receiving module 801 is further configured to receive a power negotiation request sent by the level-1 powered device, where the power negotiation request includes the port identifier and a required power of the level-2 power supply port that is allowed to be powered on in the level-1 powered device. The power management module is configured to allocate, based on the outputtable power of the power sourcing equipment and the power negotiation request, a supply power to the level-2 power supply port that is allowed to be powered on in the level-1 powered device. The sending module 803 is configured to return a power negotiation response to the level-1 powered device, where the power negotiation response includes the port identifier and the supply power of the level-2 power supply port that is allowed to be powered on in the level-1 powered device such that the level-1 powered device supplies electricity based on the supply power.

Optionally, the power-on request further includes power information of the level-2 power supply port that is detected to be valid, and the power information is a power class or a required power. The power-on instruction is further used to instruct the level-1 powered device to supply, based on a corresponding power class, electricity to the level-2 power supply port that is allowed to be powered on. Correspondingly, the power supply control module 802 is configured to obtain, based on the power-on request, the required power of the level-2 power supply port that is detected to be valid, and when the outputtable power of the power sourcing equipment meets a sum of required powers required by all level-2 power supply ports that are detected to be valid in the level-1 powered device, determine all the level-2 power supply ports that are detected to be valid, as level-2 power supply ports that are allowed to be powered on, or when the outputtable power of the power sourcing equipment does not meet a sum of required powers required by all level-2 power supply ports that are detected to be valid in the level-1 powered device, determine, based on a power supply policy from all the level-2 power supply ports that are detected to be valid, the level-2 power supply port that is allowed to be powered on.

For implementation details about the power supply control module 802, refer to the power supply management method shown in FIG. 6. Details are not repeated herein.

Further, the power sourcing equipment further includes a traffic monitoring and power adjustment module configured to monitor traffic of a first level-2 powered device in real time, where the first level-2 powered device is connected to a first level-2 power supply port of the level-1 powered device and extracts electricity from the first level-2 power supply port, and the first level-2 power supply port is a level-2 power supply port that is allowed to be powered on in the level-1 powered device, and adjust a supply power of the first level-2 power supply port based on the traffic of the first level-2 powered device.

For implementation details about the traffic monitoring and power adjustment module, refer to the power supply management method shown in FIG. 6. Details are not repeated herein.

Figure 9:
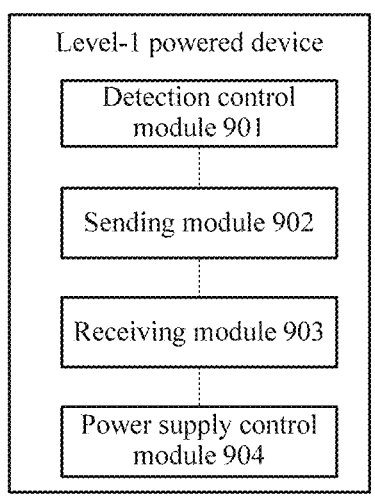
FIG. 9 is a schematic structural diagram of a level-1 powered device according to an embodiment of the present disclosure.

FIG. 9 shows a level-1 powered device according to an embodiment of the present disclosure. The level-1 powered device is configured to implement the level-1 powered device 21 in the power supply management methods provided in the embodiments of the present disclosure, and the level-1 powered device includes a detection control module 901, a sending module 902, a receiving module 903, and a power supply control module 904.

The detection control module 901 is configured to perform detection on all level-2 power supply ports of the level-1 powered device, to determine a level-2 power supply port that is detected to be valid.

The sending module 902 is configured to send a power-on request to power sourcing equipment, where the power-on request includes a port identifier of the level-2 power supply port that is detected to be valid in the level-1 powered device such that the power sourcing equipment determines, from the level-2 power supply port that is detected to be valid in the level-1 powered device, a level-2 power supply port that is allowed to be powered on, and the level-1 powered device is connected to a level-1 power supply port of the power sourcing equipment, and extracts electricity from the level-1 power supply port.

The receiving module 903 is configured to receive a power-on instruction returned by the power sourcing equipment, where the power-on instruction includes a port identifier of the port allowed to be powered on, and the port allowed to be powered on is the level-2 power supply port that is detected to be valid and allowed to be powered on in the level-1 powered device.

The power supply control module 904 is configured to power on, according to the power-on instruction, the port allowed to be powered on.

Optionally, the detection control module 901 is further configured to perform detection on any level-2 power supply port, and when the level-2 power supply port is detected to be valid, immediately obtain, through physical layer classification, a power class of the level-2 power supply port that is detected to be valid. Correspondingly, the power-on request further includes the power class of the level-2 power supply port that is detected to be valid in the level-1 powered device, and the power supply control module 904 is further configured to supply, based on a power class of the port allowed to be powered on, electricity to the port allowed to be powered on.

Optionally, the receiving module 903 is further configured to receive a power adjustment instruction sent by the power sourcing equipment, where the power adjustment instruction includes the port identifier and an adjusted supply power of the port allowed to be powered on, and the power supply control module 904 is further configured to adjust, based on the adjusted supply power of the port allowed to be powered on in the power adjustment instruction, a supply power of the port allowed to be powered on.

Optionally, the receiving module 903 is further configured to receive a power-off instruction sent by the power sourcing equipment, where the power-off instruction includes the port identifier of the port allowed to be powered on, and the power supply control module 904 is further configured to power off, according to the power-off instruction, the port allowed to be powered on.

The level-1 powered device provided in this embodiment of the present disclosure cooperates with the power sourcing equipment, and the power sourcing equipment implements power supply control and power management on the level-1 powered device and a level-2 powered device connected to the level-1 powered device, improving power supply management efficiency of the power sourcing equipment. In addition, the level-1 powered device does not need to perform power allocation and management. This can further reduce overheads of the level-1 powered device.

In the embodiments of the present disclosure, PoE is used as an example to describe how the power sourcing equipment 10 centrally performs power supply control and power management on the level-1 powered device and the level-2 powered device. This is also applicable to a scenario in which a similar power supply technology such as Power over Data Lines (PoDL) is used. In a PoDL scenario, adaptive modifications, variations or replacements that can be made by a person skilled in the art based on the embodiments of the present disclosure and depending on different protocols shall also fall within the protection scope of the present disclosure.

A person of ordinary skill in the art may understand that all or some of the steps of the method embodiments may be implemented by a program instructing relevant hardware. The corresponding program may be stored in a computer readable storage medium. The storage medium may be a RAM, a read-only memory (ROM), a flash memory, a hard disk, a solid state disk, an optical disc, or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power supply management method implemented by a power sourcing equipment, the power supply management method comprising:
   receiving a power-on request from a level-1 powered device, wherein the power-on request comprises a first port identifier of a first level-2 power supply port that is valid in the level-1 powered device, and wherein the first level-2 power supply port is valid in the level-1 powered device comprises a detection impedance of the first level-2 power supply port being within a preset range;
   determining, based on the power-on request and an outputtable power of the power sourcing equipment, a second level-2 power supply port that is allowed to be powered on in the level-1 powered device;
   sending a power-on instruction to the level-1 powered device, wherein the power-on instruction comprises a second port identifier of the second level-2 power supply port, and wherein the power-on instruction instructs the level-1 powered device to power on the second level-2 power supply port;
   monitoring traffic of a first level-2 powered device in real time, wherein the first level-2 powered device is coupled to a third level-2 power supply port of the level-1 powered device and is configured to extract electricity from the third level-2 power supply port; and
   adjusting a supply power of the third level-2 power supply port based on the traffic.

2. The power supply management method of claim 1, further comprising determining fourth level-2 power supply ports that are valid in the level-1 powered device when the outputtable power meets a sum of power-on powers of all the fourth level-2 power supply ports.

3. The power supply management method of claim 2, wherein after sending the power-on instruction, the power supply management method further comprises:
   receiving a power negotiation request from the level-1 powered device, wherein the power negotiation request comprises the second port identifier and a required power of the second level-2 power supply port;
   allocating, based on the outputtable power and the power negotiation request, a supply power to the second level-2 power supply port; and
   returning a power negotiation response to the level-1 powered device, wherein the power negotiation response comprises the second port identifier and the supply power to prompt the level-1 powered device to supply electricity based on the supply power.

4. The power supply management method of claim 3, further comprising:
   obtaining, from the power negotiation request, the required power;
   allocating, based on required powers of all the fourth level-2 power supply ports, supply powers to all the fourth level-2 power supply ports when the outputtable power meets a sum of the required powers; and
   allocating, based on a power allocation policy, the supply power to the second level-2 power supply port when the outputtable power does not meet the sum of the required powers.

5. The power supply management method of claim 1, wherein the power-on request further comprises power information of the first level-2 power supply port, wherein the power information is either a power class or a required power, and wherein the power-on instruction further instructs the level-1 powered device to supply, based on a corresponding power class, electricity to the second level-2 power supply port.

6. The power supply management method of claim 1, further comprising:
   reducing the supply power of the third level-2 power supply port and sending a power adjustment instruction to the level-1 powered device when the traffic is less than a preset traffic threshold within a preset monitoring time, wherein the power adjustment instruction comprises a third port identifier of the third level-2 power supply port and an adjusted supply power, and wherein the power adjustment instruction instructs the level-1 powered device to supply electricity to the third level-2 power supply port based on the adjusted supply power; and
   sending a power-off instruction to the level-1 powered device when the first level-2 powered device does not comprise the traffic within the preset monitoring time, wherein the power-off instruction comprises the third port identifier, and wherein the power-off instruction instructs the level-1 powered device to power off the third level-2 power supply port.

7. The power supply management method of claim 6, further comprising:
   keeping the third level-2 power supply port powered off within a preset power-off duration; and
   sending a second power-on instruction to the level-1 powered device when the preset power-off duration elapses, wherein the second power-on instruction comprises the third port identifier such that the level-1 powered device powers on the third fifth level-2 power supply port again.

8. A power supply management method implemented by a level-1 powered device, the power supply management method comprising:
   performing detection on all level-2 power supply ports of the level-1 powered device to determine a first level-2 power supply port that is valid, wherein the first level-2 power supply port is valid comprises a detection impedance of the first level-2 power supply port being within a preset range;

sending a power-on request to a power sourcing equipment, wherein the power-on request comprises a first port identifier of the first level-2 power supply port such that the power sourcing equipment is configured to determine, from the first level-2 power supply port, a second level-2 power supply port that is allowed to be powered on, and wherein the level-1 powered device is coupled to a level-1 power supply port of the power sourcing equipment and configured to extract electricity from the level-1 power supply port;

receiving a power-on instruction from the power sourcing equipment, wherein the power-on instruction comprises a second port identifier of the second level-2 power supply port, and wherein the second level-2 power supply port is the first level-2 power supply port;

powering on, according to the power-on instruction, the second level-2 power supply port;

sending monitoring traffic of a first level-2 powered device to the power sourcing equipment in real time, wherein the first level-2 powered device is coupled to a third level-2 power supply port of the level-1 powered device and is configured to extract electricity from the third level-2 power supply port; and receiving an instruction from the power sourcing equipment to adjust a supply power of the third level-2 power supply port based on the traffic.

9. The power supply management method of claim 8, wherein after powering on the second level-2 power supply port, the power supply management method further comprises:

obtaining, through data link layer classification, a required power of the second level-2 power supply port;

sending a power negotiation request to the power sourcing equipment, wherein the power negotiation request comprises the second port identifier and the required power such that the power sourcing equipment is configured to allocate a supply power to the second level-2 power supply port;

receiving a power negotiation response from the power sourcing equipment, wherein the power negotiation response comprises the second port identifier and the supply power; and supplying, based on the supply power, electricity to the second level-2 power supply port.

10. The power supply management method of claim 8, wherein before sending the power-on request, the power supply management method further comprises obtaining, through physical layer classification, a power class of the first level-2 power supply port.

11. The power supply management method of claim 10, wherein the power-on request further comprises the power class, and wherein after powering on the second level-2 power supply port, the power supply management method further comprises supplying, based on the power class, electricity to the second level-2 power supply port.

12. The power supply management method of claim 9, wherein after supplying the electricity to the second level-2 power supply port, the power supply management method further comprises:

receiving a power adjustment instruction from the power sourcing equipment, wherein the power adjustment instruction comprises the second port identifier and an adjusted supply power of the second level-2 power supply port; and adjusting, according to the adjusted supply power, the supply power of the second level-2 power supply port.

13. The power supply management method of claim 9, wherein after supplying the electricity to the second level-2 power supply port, the power supply management method further comprises:

receiving a power-off instruction from the power sourcing equipment, wherein the power-off instruction comprises the second port identifier; and powering off, according to the power-off instruction, the second level-2 power supply port.

14. A power sourcing equipment, comprising:

a power sourcing equipment (PSE) chip;

a level-1 power supply port coupled to the PSE chip; and a processor coupled to the PSE chip and the level-1 power supply port and configured to:

receive a power-on request from a level-1 powered device using the level-1 power supply port, wherein the power-on request comprises a first port identifier of a first level-2 power supply port that is valid in the level-1 powered device, wherein the first level-2 power supply port is valid in the level-1 powered device comprises a detection impedance of the first level-2 power supply port being within a preset range, and wherein the level-1 powered device is coupled to the level-1 power supply port and configured to extract electricity from the level-1 power supply port;

determine, based on the power-on request and an outputtable power of the power sourcing equipment, a second level-2 power supply port that is allowed to be powered on in the level-1 powered device;

send a power-on instruction to the level-1 powered device using the level-1 power supply port, wherein the power-on instruction comprises a second port identifier of the second level-2 power supply port, and wherein the power-on instruction instructs the level-1 powered device to power on the second level-2 power supply port;

monitor traffic of a first level-2 powered device in real time, wherein the first level-2 powered device is coupled to a third level-2 power supply port of the level-1 powered device and is configured to extract electricity from the third level-2 power supply port; and adjust a supply power of the third level-2 power supply port based on the traffic.

15. The power sourcing equipment of claim 14, wherein the processor is further configured to determine fourth level-2 power supply ports that are valid in the level-1 powered device when the outputtable power meets a sum of power-on powers of all the fourth level-2 power supply ports.

16. The power sourcing equipment of claim 15, wherein the processor is further configured to:

receive, using the level-1 power supply port, a power negotiation request from the level-1 powered device, wherein the power negotiation request comprises the second port identifier and a required power of the second level-2 power supply port;

allocate, based on the outputtable power and the power negotiation request, a supply power to the second level-2 power supply port; and return a power negotiation response to the level-1 powered device using the level-1 power supply port, wherein the power negotiation response comprises the second port identifier and the supply power such that the level-1 powered device is configured to supply electricity based on the supply power.

17. The power sourcing equipment of claim 14, wherein the power-on request further comprises power information of the first level-2 power supply port, wherein the power information is either a power class or a required power, and wherein the power-on instruction further instructs the level-1 powered device to supply, based on a corresponding power class, electricity to the second level-2 power supply port.

18. A powered device, comprising:
a plurality of level-2 power supply ports;
a power extraction port coupled to a power sourcing equipment;
a detection control circuit coupled to the level-2 power supply ports and configured to:
perform detection on the level-2 power supply ports; and
send a power-on request to the power sourcing equipment using the power extraction port, wherein the power-on request comprises a first port identifier of a first level-2 power supply port that is valid in the level-2 power supply ports, and wherein the first level-2 power supply port is valid in the level-2 power supply ports comprises a detection impedance of the first level-2 power supply port being within a preset range;
a power supply control circuit coupled to the level-2 power supply ports and configured to:
receive a power-on instruction from the power sourcing equipment using the power extraction port, wherein the power-on instruction comprises a second port identifier of a second level-2 power supply port allowed to be powered on, and wherein the second level-2 power supply port is the first level-2 power supply port;
power on, according to the power-on instruction, the second level-2 power supply port;
send monitoring traffic of a first level-2 powered device to the power sourcing equipment in real time, wherein the first level-2 powered device is coupled to a third level-2 power supply port of the powered device and is configured to extract electricity from the third level-2 power supply port; and
receive an instruction from the power sourcing equipment to adjust a supply power of the third level-2 power supply port based on the traffic; and
a powered device (PD) chip coupled to the power extraction port and configured to extract electricity from the power sourcing equipment to supply electricity to the detection control circuit and the power supply control circuit.

19. The powered device of claim 18, wherein the power supply control circuit is further configured to:
obtain, through data link layer classification, a required power of the second level-2 power supply port;
send a power negotiation request to the power sourcing equipment using the power extraction port, wherein the power negotiation request comprises the second port identifier and the required power such that the power sourcing equipment is configured to allocate a supply power to the second level-2 power supply port;
receive, using the power extraction port, a power negotiation response from the power sourcing equipment, wherein the power negotiation response comprises the second port identifier and the supply power; and
supply, based on the supply power, electricity to the second level-2 power supply port.

20. The powered device of claim 19, wherein the detection control circuit is further configured to obtain, through physical layer classification, a power class of the first level-2 power supply port before sending the power-on request, wherein the power-on request further comprises the power class, and wherein the power supply control circuit is further configured to supply, based on a power class of the second level-2 power supply port, electricity to the second level-2 power supply port after powering on the second level-2 power supply port.

21. The power supply management method of claim 1, wherein the power sourcing equipment comprises a router or a switch, wherein the level-1 powered device comprises a central access point, wherein the central access point is coupled to a distributed access point through the first level-2 power supply port, and wherein the power sourcing equipment supplies power to the distributed access point through the central access point.

* * * * *